US008020706B2

(12) United States Patent
Hendrickson et al.

(10) Patent No.: US 8,020,706 B2
(45) Date of Patent: Sep. 20, 2011

(54) FINES REMOVAL APPARATUS AND METHODS/SYSTEMS REGARDING SAME

(75) Inventors: David W. Hendrickson, Hibbing, MN (US); Richard F. Kiesel, Hibbing, MN (US); Rodney L. Bleifuss, Grand Rapids, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 732 days.

(21) Appl. No.: 11/660,297

(22) PCT Filed: Aug. 11, 2005

(86) PCT No.: PCT/US2005/028416
§ 371 (c)(1),
(2), (4) Date: Nov. 9, 2007

(87) PCT Pub. No.: WO2006/020707
PCT Pub. Date: Feb. 23, 2006

(65) Prior Publication Data
US 2009/0194470 A1    Aug. 6, 2009

Related U.S. Application Data

(63) Continuation-in-part of application No. 10/917,941, filed on Aug. 13, 2004, now Pat. No. 7,347,331.

(51) Int. Cl.
*B07C 5/00* (2006.01)
*B07C 1/00* (2006.01)
*B65G 15/42* (2006.01)
*B65G 21/00* (2006.01)

(52) U.S. Cl. ............... 209/707; 209/692; 198/861.5; 198/861.1; 198/699.1

(58) Field of Classification Search ............... 209/707, 209/691, 692, 693; 198/668.1, 690.2, 698, 198/699, 861.1, 861.5, 699.1, 836.3
See application file for complete search history.

(56) References Cited

U.S. PATENT DOCUMENTS
137,224 A   3/1873   Mansfield
(Continued)

FOREIGN PATENT DOCUMENTS
DE   3247696 A1 *   6/1984
(Continued)

OTHER PUBLICATIONS

Bleifuss, "Beltsizer Development for the Classification of Pellets and Rod Mill Feed," Final Report to Minnesota Department of Natural Resources Iron Ore Cooperative Research Committee, Jun. 1996; 22 pgs.
(Continued)

*Primary Examiner* — Kaitlin S Joerger
*Assistant Examiner* — Patrick Cicchino
(74) *Attorney, Agent, or Firm* — Mueting Raasch & Gebhardt, P.A.

(57) ABSTRACT

Apparatus, methods and systems are used to separate fines from objects of a feed mixture being processed (e.g., iron bearing pellets, chips and dust). For example, at least a portion of an endless belt defining a channel is movable up an incline relative to horizontal (e.g., an incline that is at an angle relative to horizontal that is greater than an angle of repose associated with the objects, but less than an angle of repose associated with the fines being removed). Further, obstruction elements may be used on the endless belt to impede the flow of the fines down the incline.

57 Claims, 11 Drawing Sheets

U.S. PATENT DOCUMENTS

| | | | |
|---|---|---|---|
| 441,060 A | 11/1890 | Conkling | |
| 503,014 A | 8/1893 | Storms | |
| 504,200 A | 8/1893 | Conkling | |
| 504,201 A | 8/1893 | Conkling | |
| 582,570 A | 5/1897 | Wynne et al. | |
| 655,161 A | 7/1900 | Poorbaugh | |
| 661,802 A | 11/1900 | Hilleary | |
| 673,172 A | 4/1901 | McKnight | |
| 726,996 A | 5/1903 | Schule | |
| 798,385 A | 8/1905 | Ayres | |
| 810,510 A | 1/1906 | Robbins, Jr. | |
| 868,412 A * | 10/1907 | Clement et al. | 209/693 |
| 822,084 A | 3/1908 | Vaudreuil | |
| 932,594 A | 8/1909 | Streckel | |
| 938,256 A | 10/1909 | Loufek | |
| 1,140,236 A | 5/1915 | Ayres | |
| 1,404,363 A | 1/1922 | Grimsrud et al. | |
| 1,532,807 A | 4/1925 | Getting et al. | |
| 1,677,247 A | 7/1928 | Neuhaus | |
| 1,817,037 A | 8/1931 | Mattison | |
| 1,964,716 A | 7/1934 | Ater | |
| 2,025,620 A | 12/1935 | Sneesby | |
| 2,047,773 A | 7/1936 | Greene et al. | |
| 2,303,762 A | 12/1942 | Reimel et al. | |
| 2,312,665 A | 3/1943 | Moore | |
| 2,318,976 A | 5/1943 | Stevens | |
| 2,792,115 A | 5/1957 | Medearis | |
| 2,880,848 A | 4/1959 | Lundy et al. | |
| 3,109,532 A | 11/1963 | Milan | |
| 3,464,538 A | 9/1969 | Hartmann | |
| 3,679,050 A | 7/1972 | Anderson et al. | |
| 3,750,864 A * | 8/1973 | Nolte | 198/707 |
| 3,756,401 A * | 9/1973 | Rosner | 209/39 |
| 3,947,349 A | 3/1976 | Fritz | |
| 4,046,680 A | 9/1977 | Fritz | |
| 4,099,622 A | 7/1978 | Burger | |
| 4,109,784 A * | 8/1978 | Hartmann | 198/821 |
| 4,204,291 A | 5/1980 | Chooljian et al. | |
| 4,260,477 A | 4/1981 | Corrans | |
| 4,317,714 A | 3/1982 | Forslund | |
| 4,475,669 A | 10/1984 | Wahl | |
| 4,583,645 A | 4/1986 | Yamamoto | |
| 4,592,833 A | 6/1986 | Perdue | |
| 4,729,827 A | 3/1988 | Corrans et al. | |
| 4,737,294 A | 4/1988 | Kukuck | |
| 4,826,018 A | 5/1989 | Lemmons | |
| 4,874,508 A | 10/1989 | Fritz | |
| 4,897,183 A | 1/1990 | Lewis, Jr. et al. | |
| 5,100,280 A | 3/1992 | George, Jr. | |
| 5,427,253 A | 6/1995 | Koehler | |
| 5,927,508 A | 7/1999 | Plath | |
| 5,931,309 A | 8/1999 | Andersson | |
| 5,961,055 A | 10/1999 | Lehtinen | |
| 6,056,879 A | 5/2000 | Schaaf et al. | |
| 6,086,761 A | 7/2000 | Green | |
| 6,253,924 B1 * | 7/2001 | Bleifuss et al. | 209/223.1 |
| 6,371,280 B1 | 4/2002 | Lindner | |
| 6,443,297 B1 * | 9/2002 | Johnston | 198/835 |
| 6,811,021 B1 * | 11/2004 | Corley | 198/690.2 |
| 6,871,745 B2 | 3/2005 | Lynn et al. | |
| 7,543,698 B2 * | 6/2009 | Haskell | 198/801 |
| 7,556,145 B2 * | 7/2009 | Elsner | 198/850 |
| 2002/0117428 A1 | 8/2002 | Rapaport | |
| 2002/0175055 A1 | 11/2002 | Ryde | |
| 2006/0081516 A1 | 4/2006 | Hendrickson et al. | |

FOREIGN PATENT DOCUMENTS

| | | | |
|---|---|---|---|
| GB | 2 261 833 A | | 6/1993 |
| JP | 03195616 A | * | 8/1991 |
| WO | WO 2006/020707 A2 | | 2/2006 |

OTHER PUBLICATIONS

"Mass Wasting and the Angle of Repose," [retrieved on Jan. 8, 2004]. Retrieved from the Internet:<URL:phoenix.liu.edu/~divenere/notes/angle_of_repose.htm>; 3 pgs.

Mintek, "Magnetic Separator," Randburg, South Africa, undated, 1 pg.

Richards, "Miscellaneous Processes of Separation," *Ore Dressing*, Chapter XVIII, New York, NY;1908:790-815.

Taggart, "Electrical Concentration," *Handbook of Mineral Dressing*, Section 13, New York, NY;1945:13-01-13-21.

Weiss, "Electrostatic and Magnetic Separation," *SME Mineral Processing Handbook*, New York, NY, 1985;1:6-36-6-38.

* cited by examiner

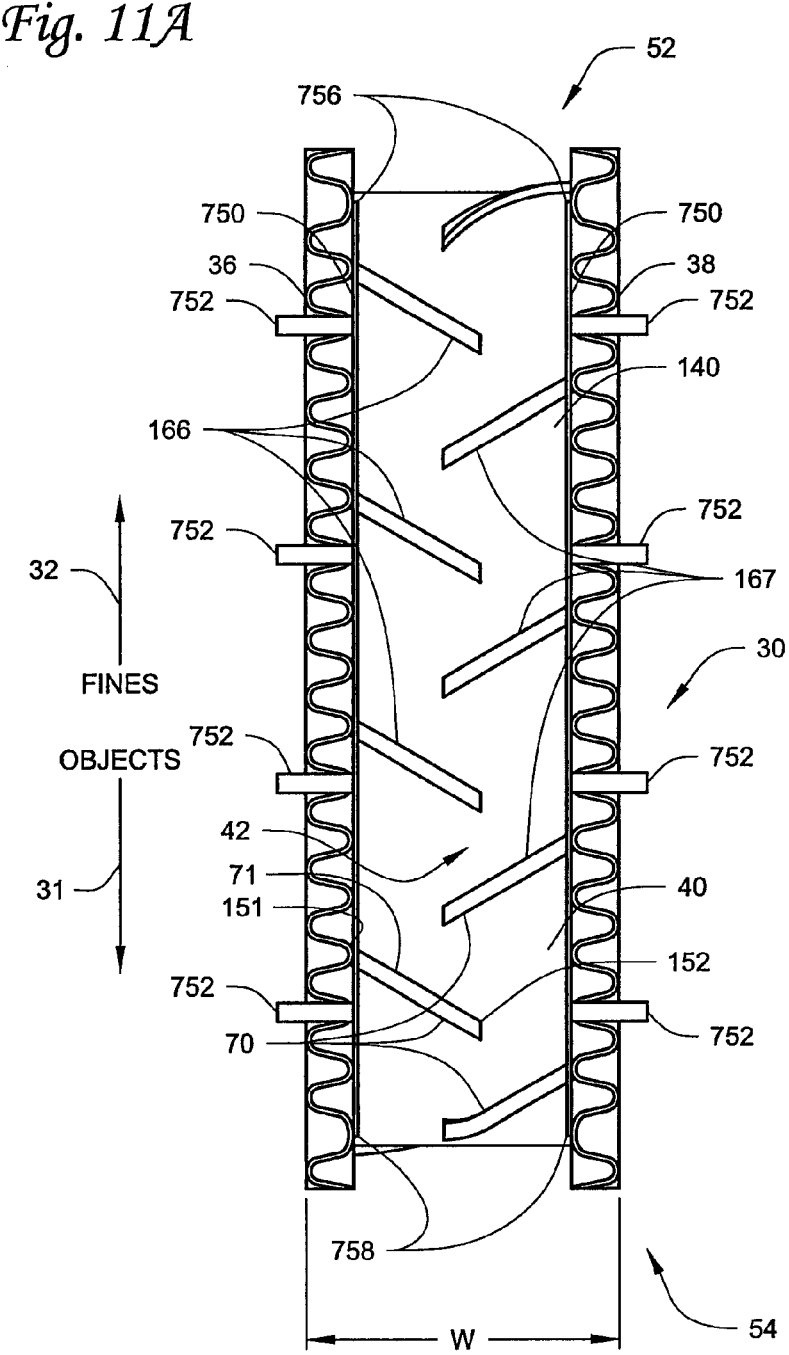

FINES REMOVAL APPARATUS AND METHODS/SYSTEMS REGARDING SAME

CROSS-REFERENCE TO RELATED APPLICATIONS

The present application is the §371 U.S. National Stage of International Application No. PCT/US2005/028416, filed 11 Aug. 2005, which is a continuation-in-part of U.S. patent application Ser. No. 10/917,941, filed on 13 Aug. 2004, both of which are incorporated herein by reference in their entirety.

BACKGROUND OF THE INVENTION

The present invention relates to systems, apparatus, and/or methods for use in processing objects (e.g., iron bearing pellets, pharmaceutical tablets, coarse rocks and aggregate materials, coal, etc.). More particularly, the present invention pertains to the separation of fines from the objects being processed (e.g., a mixture of such fines and objects, such as a feed mixture including rounded whole iron bearing pellets, pellet chips, and pellet dust).

Selective screening of materials to remove fines is a relatively common practice in various industries. For example, such screening or separation processes are commonly used in applications such as mining, food product manufacturing, wood product manufacturing, pharmaceutical product manufacturing, etc.

Different techniques for the sizing of pellets, ores, agglomerates, or other coarse materials have been described. For example, separation methods typically used employ vibrating and/or screen equipment for separating fines from coarser materials.

In the iron ore and taconite mining industry, over 200 million tons of iron ore pellets are produced worldwide, and most require screening prior to being charged into iron-making blast furnaces. Existing pellet screening has generally been accomplished with the use of vibrating screen equipment. However, such vibrating screen equipment is very capital cost and operating cost intensive (e.g., maintenance costs associated with such equipment) which makes the separation of fines from a feed mixture (e.g., a feed mixture including such pellets, dust, pellet chips, etc.) uneconomical. Further, such vibrating screen equipment may cause physical breakage and abrasion to the whole pellets being separated from the fines.

SUMMARY OF THE INVENTION

The systems, apparatus, and/or methods according to the present invention overcome one or more of the problems described herein relating to other previously used or described separation systems and methods. One embodiment of a fines removal apparatus according to the present invention for use in separation of objects from a feed mixture (e.g., a feed mixture that includes the objects and fines, such as rounded iron bearing pellets along with pellet dust and pellet chips) includes an endless belt. At least a portion of the endless belt is movable up an incline relative to horizontal (i.e., the incline is at an angle relative to horizontal that is greater than an angle of repose associated with the objects but less than an angle of repose associated with the fines). The endless belt includes an endless base section having a predetermined length and first and second sidewalls extending from the endless base section. The endless base section and the first and second sidewalls define a channel of the endless belt configured to receive the feed mixture therein. The endless belt further includes a plurality of obstruction elements, wherein each obstruction element includes at least one surface portion that extends between a first position and a second position of the endless base section such that the at least one surface portion impedes a flow of fines down the incline when feed mixture is provided in the channel and as the portion of the endless belt is moved up the incline. The fines removal apparatus further includes a drive apparatus coupled to the endless belt to move the portion of the endless belt up the incline.

In one or more embodiments of the apparatus, at least one surface portion of each obstruction element may be non-orthogonal relative to the length of the endless base section and/or each obstruction element has a thickness that is 50 percent or less than a maximum cross-section dimension of the objects of the feed mixture.

In another embodiment, the incline may be at an angle relative to horizontal that is greater than an angle of repose associated with the objects but less than 5 degrees more than the angle of repose associated with the objects.

In another embodiment of the apparatus, the at least one surface portion of each obstruction element includes a surface positioned at an angle relative to a plane extending across a width of the endless belt and orthogonal to the length of the endless base section. Further, the angle relative to the plane extending across the width of the endless belt and orthogonal to the length of the endless belt may be greater than the angle of repose for the objects to be processed but less than an angle of repose associated with the fines.

In yet another embodiment of the apparatus, the plurality of obstruction elements include a first set of elongated obstruction elements extending downward at an angle (e.g., an angle that is greater than the angle of repose for the objects to be processed but less than an angle of repose associated with the fines) relative to the first sidewall and partially across a width of the endless belt and a second set of elongated obstruction elements extending downward at an angle (e.g., an angle that is greater than the angle of repose for the objects to be processed but less than an angle of repose associated with the fines) relative to the second sidewall and partially across the width of the endless belt. The first and second sets of elongated obstruction elements are provided in an alternating arrangement such that a continuous "S" flow pattern is defined thereby.

In another embodiment of the apparatus, the endless base section of the at least a portion of the endless belt movable up the incline relative to horizontal is maintained in a substantially planar configuration (e.g., using one or more rollers).

Yet further, in one embodiment, the endless base section of the at least a portion of the endless belt movable up the incline relative to horizontal may include a textured surface for contact with the feed mixture (e.g., as opposed to being a smooth surface).

In another embodiment, the first and second sidewalls of the endless belt extend from the base section of the endless belt a predetermined distance measured perpendicularly from the base section to a distal end of the first and second sidewalls. The predetermined distance may be greater than 3 times the maximum cross-section dimension of the objects of the feed mixture.

Still further, in another embodiment, each of the first and second sidewalls includes a flexible sidewall (e.g., corrugated sidewall). The flexible sidewall includes one or more surfaces that define one or more openings adjacent the channel of the endless belt. One or more deflection elements (e.g., plug elements, integrally molded plugs, a skirt element, etc.) are positioned relative to the one or more openings to form substantially flat sidewalls adjacent the channel. The apparatus may further include a monitoring apparatus operable to monitor one or more characteristics of fines removed from the feed mixture and provide an output representative of such monitoring. The speed of the endless belt and/or the angle of incline may be adjusted based on the output.

Yet further, the apparatus may also include one or more mechanical assist devices to assist in the removal of fines and/or separation of fines from the objects of the feed mixture (e.g., at least one of a belt rapper, a belt vibrator, a belt wiper, a belt brush, off-center rollers, and belt water sprays). In addition, a distribution apparatus may be used to provide a distribution of the objects across substantially an entire width of the endless belt.

A method for use in separation of objects from a feed mixture (e.g., a feed mixture that includes objects and fines) according to the present invention includes moving at least a portion of an endless belt up an incline between a first position and a second position (i.e., the second position is elevated with respect to the first position). The incline is at an angle relative to horizontal that is greater than an angle of repose associated with the objects but less than an angle of repose associated with the fines. The endless belt includes an endless base section having a predetermined length and first and second sidewalls extending from the endless base section. The endless base section and the first and second sidewalls define a channel of the endless belt configured to receive the feed mixture therein. The endless belt further includes a plurality of obstruction elements, wherein each obstruction element includes at least one surface portion that extends between a first position and a second position of the endless base section such that the at least one surface portion impedes a flow of fines down the incline when feed mixture is provided in the channel and as the portion of the endless belt is moved up the incline. The method further includes receiving the feed mixture within the channel. The objects of the feed mixture flow downward toward the first position and the fines move upward toward the second position as the at least a portion of the endless belt is moved up the incline.

In one or more embodiments of the method, at least one surface portion of each obstruction element may be non-orthogonal relative to the length of the endless base section and/or each obstruction element may have a thickness that is 50 percent or less than a maximum cross-section dimension of the objects of the feed mixture.

In another embodiment, the incline may be at an angle relative to horizontal that is greater than an angle of repose associated with the objects but less than 5 degrees more than the angle of repose associated with the objects.

Various embodiments of the method according to the present invention include one or more features of the fines removal apparatus as described above. Further, a system that includes the fines removal apparatus alone or in combination with one or more other separation apparatus and/or take-away fines conveyors (e.g., a conveyor aligned with and positioned below at least a major portion of the endless belt) is described.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF THE DRAWINGS

FIGS. 11A-11B show the generalized top plan view illustrative of the endless belt of the fines removal apparatus shown generally in FIGS. 1 and 2 with skirt deflection elements positioned relative to sidewalls of the endless belt, and a perspective view of a portion of a skirt deflection element positioned relative to a sidewall of the endless belt, respectively.

DETAILED DESCRIPTION OF THE EMBODIMENTS

Figure 1:
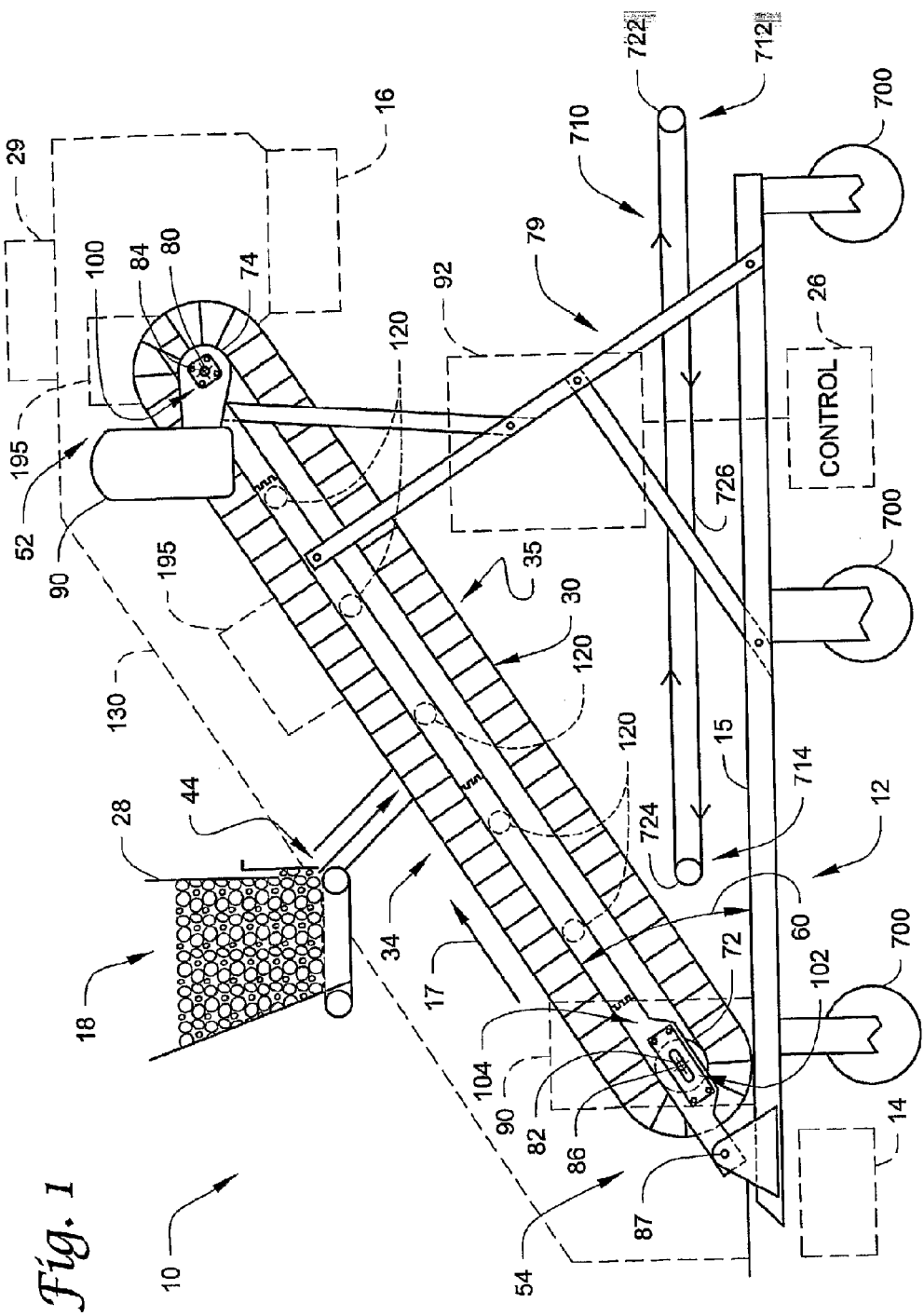
FIG. 1 is a generalized side view illustration of a fines removal system including a fines removal apparatus according to the present invention.

The present invention shall generally be described with reference to FIG. 1. Various embodiments of the present invention shall be described with reference to FIGS. 2-11, including a recovery system shown in FIG. 8 for use in separating fines using an apparatus such as that shown in FIGS. 1-7 and/or 9-11 along with one or more further separation apparatus.

It will become apparent to one skilled in the art that elements from one embodiment may be used in combination with elements of other embodiments even if not shown or specifically described in a combination, and that the present invention is not limited to the specific embodiments described herein but only as described in the accompanying claims. Further, it will be recognized that the embodiments of the present invention described herein will include many elements that are not necessarily shown to scale and that the features presented herein may be scaled for commercial use.

As used herein, the term "objects" refers to objects that are part of a feed mixture and which are to be separated from fines of the mixture. In one embodiment, the objects being processed are of a similar size and shape (e.g., a uniform size and shape). For example, objects that may be processed according to the present invention include, but are clearly not limited to, iron bearing objects (e.g., rounded whole iron ore pellets), mineral bearing ores, coarse rocks and aggregate materials (e.g., taconite pellets, copper, nickel ores, or Class 5 aggregate), metal objects (e.g., aluminum oxide pellets), coal, food products (e.g., peas, beans, corn, etc.), plastic objects (e.g., recycled plastic or plastic pellets), wood products (e.g., sawdust, wood pellets, or wood chips), agricultural products (e.g., wheat, corn, etc.), pharmaceutical products (e.g., pharmaceutical tablets or pills), chemical products (e.g., powders, beads, or lump chemicals), etc.

In one embodiment, the objects have a rounded shape. When rounded is used herein to refer to the shape of an object, the outer surface of the object need not be perfectly round. For example, the term rounded shall encompass objects where substantially (i.e., greater than 75%) the entire outer surface is curved as opposed to being planar. For example, the outside surface may be elliptical.

It will be recognized that the present invention may also be used for objects where less than substantially the entire outer surface is curved as opposed to being planar. For example, objects where greater than 50% of the entire outer surface is curved as opposed to being planar may be processed according to the present invention, as well as objects where greater than 25% of the entire outer surface is curved as opposed to being planar. Although, substantially planar objects may be processed according to the present invention, the present invention is particularly advantageous for objects having curved outer surface.

As used herein, the term "fines" is defined relative to the objects being processed. Fines refers to material that exists (e.g., material including one or more constituents) with the objects in a feed mixture and which is to be separated therefrom. Generally, the fines have a constituent size (i.e., a size of the constituents of the fines) that is less than about one-half the size of the objects (i.e., occupies less than one half the volume in space that is occupied by an object).

For example, in one embodiment, the feed mixture processed according to the present invention includes whole iron bearing pellets (e.g., rounded iron bearing pellets), pellet chips, and dust. In accordance with the definition for the term "fines", in this embodiment, the fines would include all constituents of feed mixture that are less than about one-half the size of the whole iron bearing pellets (e.g., ½ inch pellets). In other words, the fines would include the pellet chips as well as the pellet dust.

As used herein, the term "angle of repose" refers to the steepest angle relative to horizontal at which objects will remain standing in a pile on a surface, rather than sliding or crumbling away. Angle of repose is sometimes referred to as angle of rest and will vary depending on the size, shape, specific gravity, and composition of the objects.

As will be apparent from the description herein, at least one embodiment of the present invention is based on making use of the different angles of repose for different materials. Based upon the theory of angle of repose, a functional, efficient fines removal system 10 is provided, as shown generally in FIG. 1. One skilled in the art will recognize that many applications of this separation system can be implemented by measuring the various different angles of repose of various products (with fines) produced in the chemical, pharmaceutical, food, aggregate, as well as other industries to separate unwanted fines from a feed mixture that also includes the final desired product (e.g., objects of the feed mixture separated from such fines, or the fines).

Although the present invention is not limited to any particular application or industry (e.g., the separation of various types of objects, as described herein, may be accomplished), the present invention is particularly beneficial for removing pellet fines from a feed mixture including iron-bearing pellets (e.g., rounded iron ore pellets). For example, the measured angle of repose for certain taconite pellets having a size of ½ inch was determined to be about 32°, and the angle of repose of pellet fines was determined to be about 34°. Such a difference in angle of repose between the objects (e.g., the iron-bearing pellets) and such fines allows for the separation of pellets from the fines according to the present invention. In other words, at least in one embodiment, if an upwardly moving angled surface is placed at an angle greater than 32° but less than 34°, and the iron-bearing pellets as part of a feed mixture (including such pellets along with the fines) are provided onto such a moving angled surface, the rounded iron-bearing pellets would roll down the inclined surface while the pellet fines would generally not flow down the incline and could be carried up and away by the moving inclined surface.

Separation is generally provided by the moving inclined surface that takes away the fines and allows the pellets to roll down the surface. In one embodiment, a conveyor belt is used as the moving surface. For example, the belt angle is set at about 33° or 33.5° and fed with iron-bearing pellets, with an appropriate feed rate for the pellets. Generally, the conveyor belt has sidewalls to permit flow of the pellets down the conveyor without loss to the side of the belt.

In addition, the same angle of repose theory can be used to design a pattern of obstruction elements (e.g., a pattern of low height angled rubber lugs fixed to a flat conveyor belt surface) which may further be beneficially used to separate the iron-bearing pellets from the fines of the feed mixture. For example, the obstruction elements (e.g., lugs or cleats) may be angled at 33° to hold the fines but allow the iron-bearing pellets to roll down a path established by the pattern of angled obstruction elements and/or over the obstruction elements.

FIG. 1 shows a generalized side view illustration of the fines removal system 10 that includes a fines removal apparatus 12 according to the present invention. The generalization of FIG. 1 is provided to indicate that the fines removal system 10 may include one or more various features according to the present invention in one or more various combinations (see, e.g., the generalization of drive apparatus 90, adjustment elements 92, mechanical assist devices 195, etc.). For example, as discussed further herein, the fines removal apparatus may include: a variable speed drive belt motor to allow onboard changes in belt speed to optimize the system 10; hydraulic cylinders in a belt frame mechanism to allow onboard variability in belt angle; under belt wrappers and/or vibrators to help increase fines separation from objects (e.g., whole pellets); optional belt wipers and/or brushes to wipe off any excess fines sticking to the belt located at the system head pulley discharge at the top of the belt and on the underside or return stroke of the belt; belt water sprays that may be included to wash off fines on the belt return; belt covers and dust collector hoods positioned at appropriate places on the belt system to reduce fugitive dust emissions; obstruction elements such as rubber, urethane, or other wear-resistant lugs affixed to the belt surface in various ways at appropriate angles to act as the main fines removal component carrying away fines to the top of the belt; variability in position of feed to allow objects (e.g., whole pellets) to roll down and fines to be carried away to the top of the belt; process control feedback subsystems to be used in the adjustment of various parameters of the system such as angle adjustment or speed adjustment; take-away conveyors position below the belt for removing fines, etc. One skilled in the art will recognize that one or more of such features may be used in one or more of the embodiments according to the present invention as will be apparent from the description herein.

The fines removal system 10 includes the fines removal apparatus 12 for separating objects 31 from a feed mixture 18 fed onto an endless belt 30. The feed mixture 18 includes at least objects 31 and fines 32 (see FIGS. 2 and 4) which are separated according to the present invention as shall be described herein. Upon separation of the objects 31 from the feed mixture 18 (e.g., the objects 31 moving down the inclined endless belt 30), such objects 31 are collected by object collection apparatus 14. Likewise, the fines 32 of the feed mixture 18 are carried up the moving inclined endless belt 30 and discharged into fines collection apparatus 16.

The object collection apparatus 14 may be any suitable collection device and/or system for collecting, removing, moving, or otherwise manipulating the objects 31 separated from the feed mixture 18. The present invention is not limited to any particular object collection apparatus 14 but may include apparatus such as conveyors, trucks, loaders, hoppers, etc.

The fines collection apparatus 16 may be any suitable collection device and/or system for collecting, removing, moving, or otherwise manipulating the fines 32 separated from the feed mixture 18. The present invention is not limited to any particular fines collection apparatus 16 but may include apparatus such as conveyors, trucks, loaders, hoppers, etc.

In one embodiment, as shown in FIG. 1, the fines collection apparatus may include a take-away conveyor 710 having a conveyor length. The conveyor 710 is aligned with and positioned below at least a major portion of the endless belt 30 (i.e., a portion greater than 50 percent). Preferably, the conveyor is aligned with and positioned below substantially the entire endless belt 30 (i.e., greater than 75 percent).

The take-away conveyor 710 may extend between a first end 712 and a second end 714. The second end 714 is positioned below the endless belt 30 at the lower end 54 and the first end 712 is positioned outward from the upper end 52 of the endless belt 30 such that fines moved up the incline and separated from the objects are carried away (e.g., upon discharge from the upper end 52),and/or fines undesirably associated with the endless belt 30 along the lower run 35 fall onto the conveyor 710 as the endless belt 30 is returned to the lower end 54.

In one embodiment, the conveyor 710 may include a first roller 722 operatively provided at the first end 712 and a second roller 724 operatively provided at the second end 714. An endless belt 726 is provided for movement of the fines from the second end 714 to the first end 712 for discharge to one or more other collection apparatus (e.g., such as those described herein).

The take-away conveyor 710 may be a portable unit that can be put in place or positioned after the endless belt 30 (e.g., the main fines removal conveyor) is raised into the correct operational angle. The take-away conveyor 710 may be a standard conveyor running on idlers. Further, the conveyor 710 may include apparatus that allows the conveyor 710 to slide into place between the support structure 79 (e.g., the hydraulic lift mechanism) for the endless belt 30.

The fines take-away conveyor 710 may be pushed back towards the lower end 54 of the main fines removal endless belt 30 and may extend out beyond the top of the endless belt 30 at upper end 52. In this position below or under, and aligned with, the endless belt 30, the fines take-away conveyor 710 will collect fines dropping off or being discharged from the upper end 52 of the endless belt 30, dropping off of the middle section of the endless belt 30 along the lower run 35, and dropping off of the lower section of the endless belt 30 along the lower run 35 closer to the lower end 54. In other words, fines coming off the endless belt would be collected and carried away by this additional fines take-away conveyor 710 positioned below the main fines removal endless belt 30. This may reduce the buildup of fines below the main endless belt 30. Such a buildup if allowed to occur may be an operating and maintenance problem requiring downtime and clean-up.

Generally, the fines removal apparatus 12 according to the present invention includes an endless belt 30. At least a portion of the endless belt 30 is moveable up an incline relative to horizontal 15, as shown by the ascending upper run 34 of the endless belt 30 in FIG. 1. Further, generally, the endless belt 30 includes sidewalls 36, 38 (shown in FIG. 3) extending from a base section 40 thereof which define a channel 42 of the endless belt 30.

The channel 42 receives a feed mixture 18 (e.g., at least objects and fines, such as iron ore pellets, pellet chips, pellet dust) from a feed source 28 via outlet 44. In other words, the feed mixture 18 received in channel 42 may be any feed mixture including objects that are to be separated from fines of the feed mixture 18.

Figure 3:
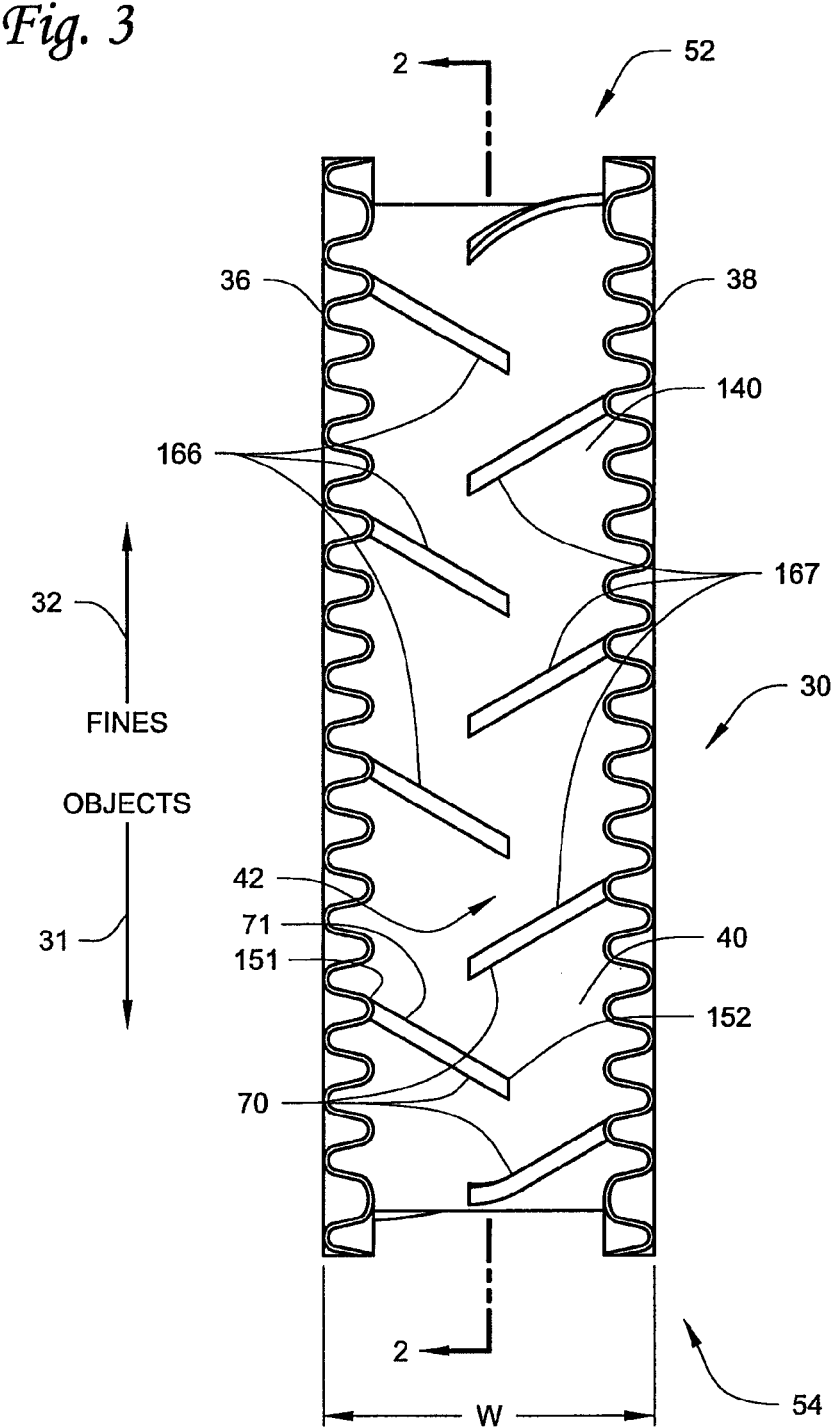
FIG. 3 is a generalized top plan view illustrative of the endless belt of the fines removal apparatus shown generally in FIGS. 1 and 2 according to the present invention.
Figure 9A:
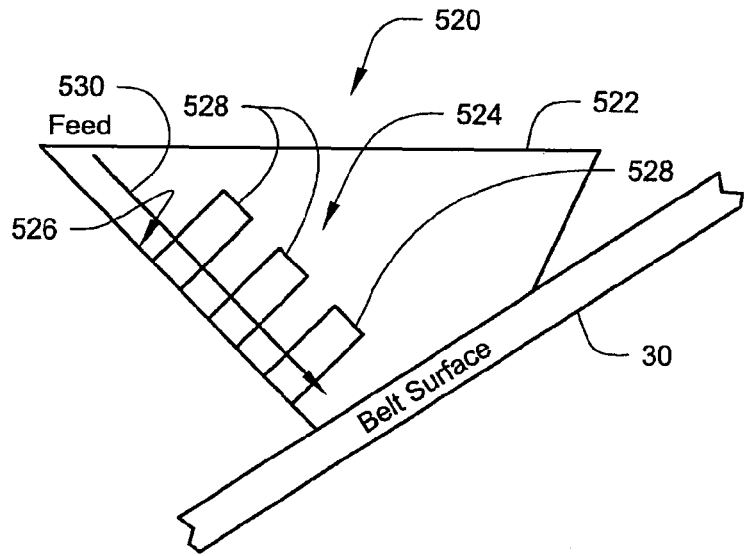
FIGS. 9A-9B shows a side view and a top view, respectively, of one general embodiment of a feed distribution system that may be used with the fines removal apparatus shown generally in FIG. 1 according to the present invention.
Figure 9B:
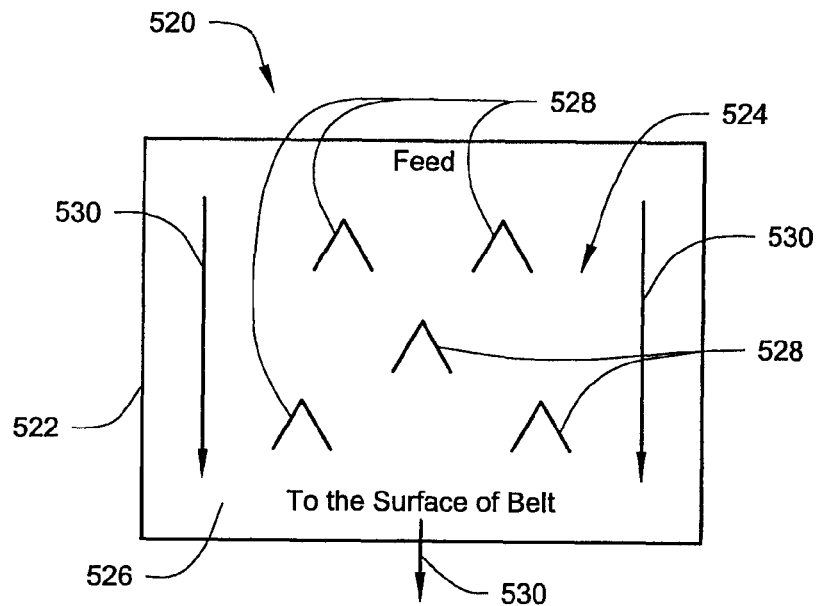

One embodiment of a distribution apparatus 520 that may be employed as part of the feed source 28, or as a portion of the fines removal apparatus 12 (e.g., configured with the enclosure 130), according to the present invention, is shown in the side and top plan views, respectively, of FIGS. 9A-9B. As shown therein, the feed distribution apparatus 520 ensures that substantially the full width of the belt 30 (e.g., the base section 40 of the belt 30) is covered with objects (e.g., pellets) as they are laid down onto the belt surface (e.g., belt surface 140 as shown in FIG. 3). For example, some feed streams might be less in width than the fines removal belt width. In order to maximize fines removal, at least in one embodiment, utilization of the full width of the fines removal belt 30 should be used by providing a distribution of objects across substantially the entire width of the belt 30 when the objects are fed onto the belt 30. The term "substantially the entire width" refers to at least 75% of the belt width, however, at least in one or more other embodiments, the objects are distributed across greater than 90% of the belt width. At least in one embodiment, the objects are distributed across the entire width of the belt 30.

Further, in one embodiment, as shown in FIGS. 9A-9B, the feed distribution apparatus 520 includes a hopper 522, or any other feed receiving container, for receiving the objects and providing (e.g., distributing) them onto the belt 30, and a distributor apparatus 524 for directing the objects such that they are fed across substantially the entire width of the belt 30. The distributor apparatus 524 includes a plurality or series of elements 528 arranged in a pattern suitable to direct the objects such that they are fed across substantially the entire width of the belt 30.

In one embodiment, the plurality of elements 528 include a plurality of wedge shaped posts as shown in FIG. 9A and FIG. 9B. The plurality of wedges 528 are arranged in a pattern on an included surface of the hopper 522 such that the objects if fed at the center of the width of the belt are distributed out (i.e., toward the walls of the belt 30) and down (in the direction of the arrows 530) onto the full width of the width of the belt 30. In FIG. 9B, the wedges 528 are arranged in a pyramid shape that gets larger as one proceeds down the inclined surface 526. However, any arrangement of the plurality of elements 528 that directs the objects such that they are fed across substantially the entire width of the belt 30 may be used.

The mixture feed point where the feed mixture 18 is provided to channel 42 may be at any position along the upper run 34 of the endless belt 30 such that the objects 31 of the feed mixture 18 move down the ascending upper run 34 of the endless belt 30 as the endless belt 30 is moved up the incline relative to horizontal 15. Further, as the objects 31 move down the inclined portion of the endless belt 30, the fines 32 of the feed mixture 18 are carried beyond the mixture feed point against the flow of the objects 31 down the inclined upper run 34 of the endless belt 30. The fines 31 are discharged at the upper end 52 of the endless belt 30, such as by gravity, as the endless belt 30 descends (e.g., to the lower end region 54 of the endless belt 30) along a lower run 35 thereof.

Figure 2:
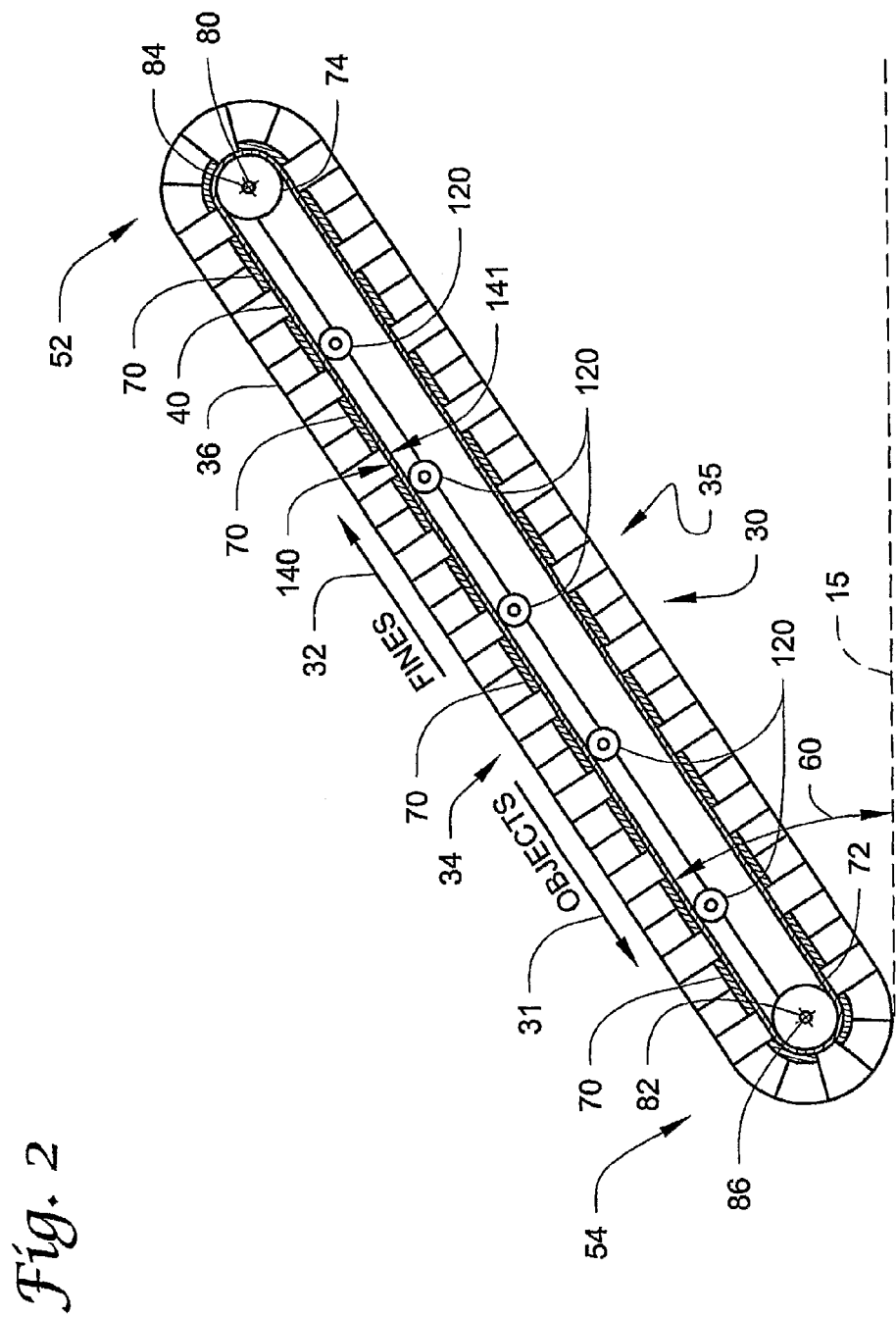
FIG. 2 is a generalized cross-sectional view of the endless belt of the apparatus shown generally in FIG. 1 and taken along line 2-2 as shown in FIG. 3.

For example, discharge may occur into fines collection apparatus 16 and/or may occur along the lower run 35 between the upper end 52 and lower end 54 of the endless belt 30. The objects 31, as shown in FIG. 2, are discharged from the fines removal apparatus 12 at the lower end 54 of the endless belt 30 as they move down the upper run 34. The objects 31 may be discharged into the object collection apparatus 14 or removed from the fines removal apparatus 12 in any other suitable manner.

The fines 32 are removed from the feed mixture 18, and the objects 31 of the feed mixture 18 are separated therefrom, based at least on part on the angle of repose theory described herein. In other words, the angle of incline 60 relative to horizontal 15 is selected such that it is greater than an angle of repose associated with the objects 31 but less than an angle of repose associated with the fines 32. At least in one embodiment, the angle of incline 60 relative to horizontal 15 is greater than an angle of repose associated with the objects 31 but less than 5° more than the angle of repose associated with such objects 31. In such a manner, the objects 31 are allowed to tumble down the upper run 34 of the endless belt 30 while the fines 32 are carried using the obstruction elements fixed to the surface of the moving endless belt 30 up the incline to the upper end region 52 for discharge (i.e., the belt moving in the direction of arrow 17). As will be described further herein, obstruction elements 70, e.g., elements such as shown in FIGS. 2-5, may also be used to facilitate separation of the fines 32 from the objects 31 according to the present invention.

The fines removal apparatus 12 according to the present invention provides for the effective separation of objects 31 for a large feed capacity. For example, the essentially open channel 42 allows for the free flow of objects 31 down the upper run 34 of the inclined endless belt 30. Further, for example, with use of high sidewalls, the volumetric flow rate of feed mixture 18, and hence the machine capacity, may be, for example, 200 tons per hour of iron-bearing pellet feed mixture.

Figure 6:
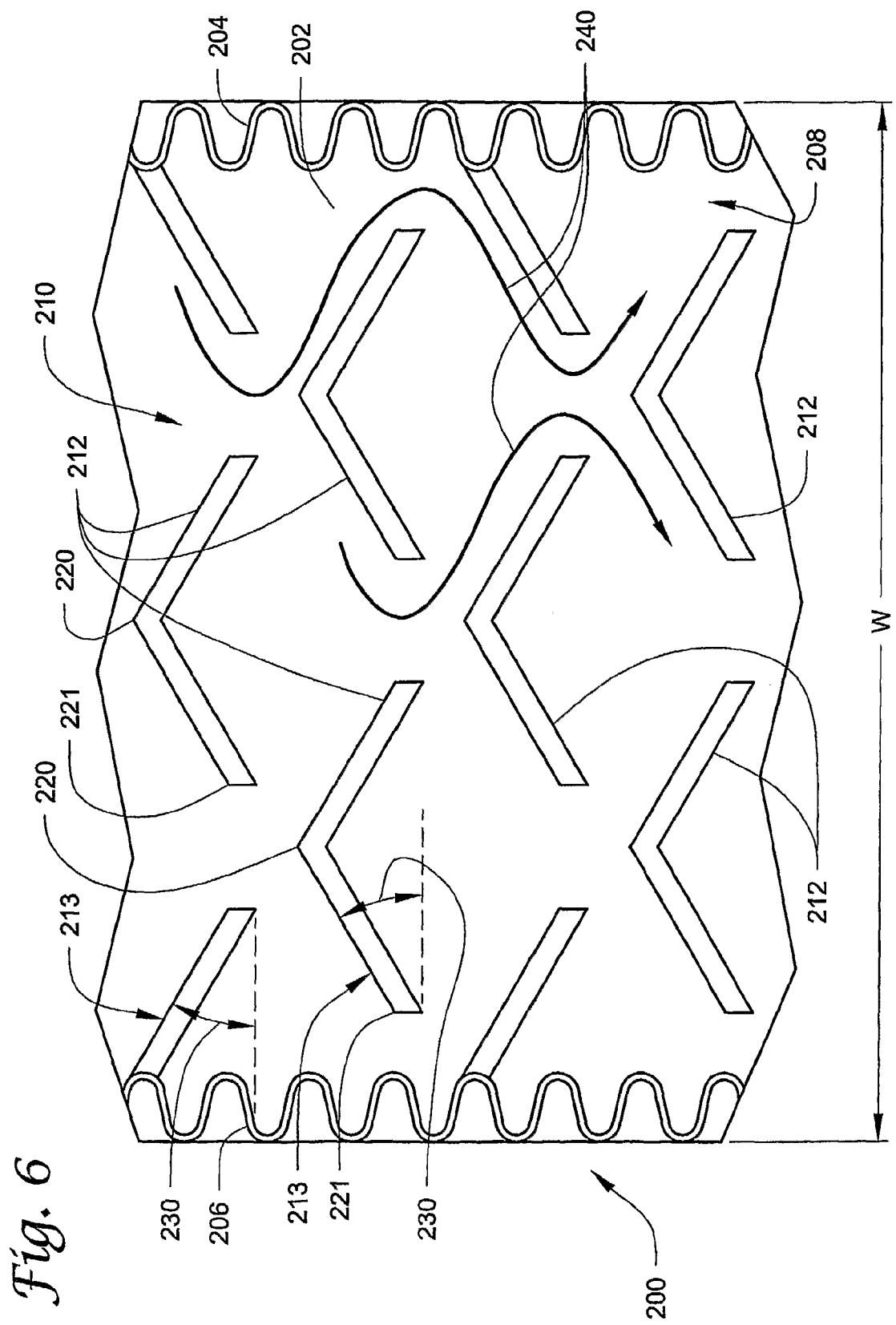
FIG. 6 is a generalized top plan view illustrative of another embodiment of an endless belt that may be used in the fines removal apparatus shown generally in FIG. 1 according to the present invention.

For example, in one embodiment, the width (W) of the endless belt 30 may be 4 feet across and include sidewalls that are 8 inches high. Such an apparatus may provide separation of the 200 tons per hour of feed mixture 18 including rounded iron bearing pellets and fines. In such an embodiment where the width (W) is quite large (e.g., as shown in FIG. 6), the pattern of obstruction elements extending between the sidewalls of the endless belt (i.e., across the width of the belt) may include a plurality of elements side by side across the width, for example, forming multiple S-type flow patterns in the channel thereof.

The present invention further provides very effective separation using an apparatus which is particularly simple in design. Because of such simplicity, the fines removal apparatus 12 according to the present invention may be constructed at a much lower cost relative to many conventional machines. Further, such lower costs are applicable when the fines removal apparatus 12 is increased in size as it is scaled up to larger commercial sizes.

Figure 4:
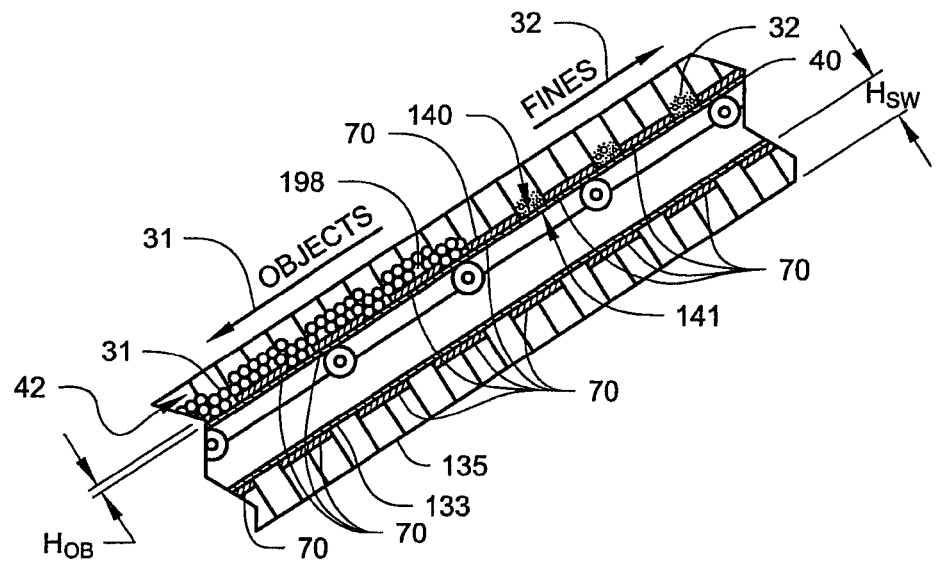
FIG. 4 shows a more detailed view of a portion of the cross-sectional view shown in FIG. 2.
Figure 5:
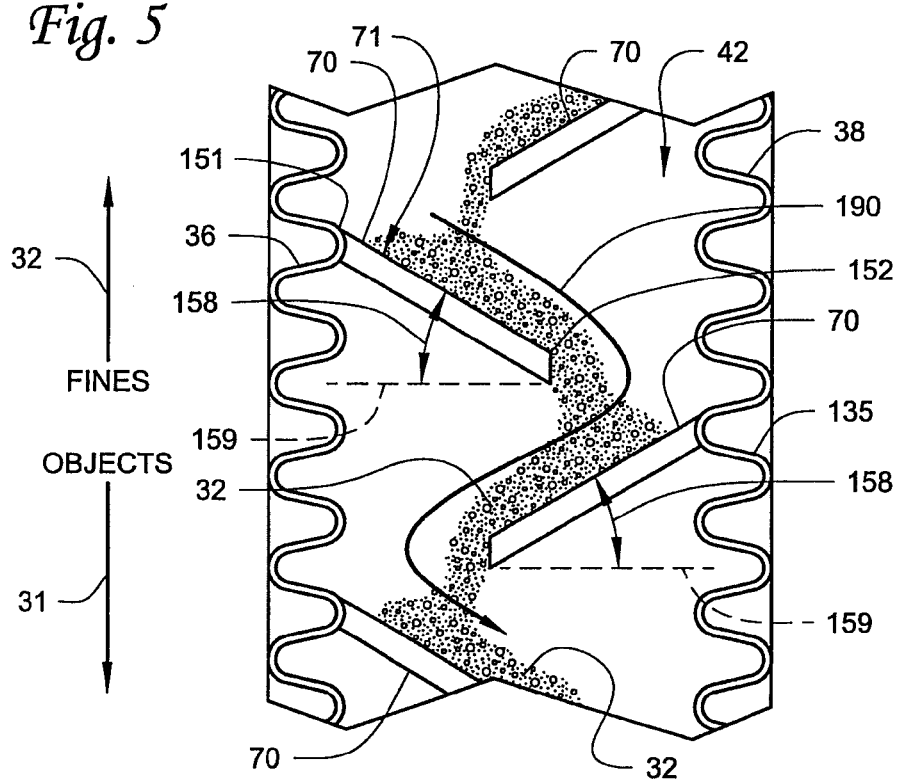
FIG. 5 shows a more detailed view of a portion of the top plan view shown in FIG. 3.

As previously indicated, FIG. 1 is a generalized side view illustration of the fines removal system 10 including the fines removal apparatus 12. FIG. 2 is a generalized cross-section view of one embodiment of the endless belt 30 of the fines removal apparatus 12 taken along line 2-2 of FIG. 3, while FIG. 3 is a generalized top plan view of the endless belt 30. Further, FIGS. 4 and 5 show a more detailed view of a portion of the endless belt 30 shown in FIGS. 4 and 5, respectively.

As shown in FIG. 1, the fines removal apparatus 12 includes a support structure 79 for supporting the endless belt 30. The endless belt 30 includes the upper run 34 movable up an incline relative to horizontal 15 between the lower region 54 and the upper region 52 of the fines removal apparatus 12. The lower run 35 of the endless belt 30 moves in a descending manner between the upper region 52 and the lower region 54 of the fines removal apparatus 12.

Further, as shown in FIGS. 1 and 2, the endless belt 30 is positioned about two primary rollers 72, 74 for continuous operation with return of the lower run 35 of the endless belt 30 after discharge of fines 32 via an opening in support structure 79. Generally, according to the present invention the support structure 79 includes elements for use in positioning at least a portion of the endless belt 30 which is moveable up an incline at an angle relative to horizontal 15; the angle being greater than an angle of repose associated with the objects 31 but less than an angle associated with the fines 32. As indicated previously herein, for iron-bearing pellets having a size of about ½ inch, the angle of repose is about 32° and that of the pellet fines is about 34°. As such, using such angles of repose, the angle of incline would be set appropriately for separation of such iron-bearing pellets from the pellet fines of a feed mixture including such constituents.

In one embodiment, the angle of incline 60 is selected to be less than 5° more than the angle of repose associated with the objects. In such a manner, tumbling of objects 31 is accomplished while a large percentage of the fines is carried upward for discharge at upper end region 52 of the endless belt 30. In other embodiments, the angle of incline 60 may be selected to be less than 3° more than the angle of repose associated with the objects, and even less than 2° more than the angle of repose associated with the objects. In another embodiment, the angle of incline 60 is selected to be 1° or more than the angle of repose associated with the objects.

In the exemplary embodiment shown in FIGS. 1-5, two primary rollers (upper end roller 74 and lower end roller 72) are supported for rotation thereof by support structure 79. The upper end roller 74 and lower end roller 72 are fixed and separated by a predetermined distance. As shown in FIGS. 1-2, upper end roller 74 is affixed to axle 80 with longitudinal axis 84 extending therethrough. Axle 80 is coupled to structure 79 at coupling region 100 allowing for rotation of the upper end roller 74 about longitudinal axis 84. An end of axle 80 is connected for rotation thereof by a drive apparatus 90.

Drive apparatus 90 controls rotation of axle 80 and, as such, controls rotation of roller 74 which imparts movement to endless belt 30 up the incline relative to horizontal 15. Any suitable drive mechanism may be used and the present invention is not limited to any particular drive component.

Preferably, the endless belt 30 is moved at a speed in the range of about 150 to about 300 feet per minute. However, such speed will be dependent at least in part on the angle of incline and, of course, on the application for which the fines removal apparatus 12 is being used. A control system 26 is used for controlling one or more functions of the fines removal apparatus 12 including controlling drive apparatus 90.

Lower end roller 72, as shown in FIGS. 1-2, includes an axle 82 extending along axis 86 thereof. Axle 82 is coupled to structure 79 in region 102 by appropriate structure for allowing rotation thereof about longitudinal axis 86.

Lower end roller 72 includes an adjustment mechanism 104 for increasing or decreasing the distance between longitudinal axis 84 extending through the upper end roller 74 and the longitudinal axis 86 extending through the lower end roller 72. As such, adjustment mechanism 104 provides for adjustment of belt tension. Such an adjustment mechanism 104 may be provided by a slide and lock mechanism or by any other mechanism, such as a counterweight or a take-up pulley.

The upper end roller 74 (e.g., the drive roller in this particular embodiment) is mounted an elevation from horizontal 15, which is greater than the elevation of lower end roller 72, to provide for the incline of the upper run 34 of endless belt 30. One skilled in the art will recognize that only a portion of the endless belt 30 may need to be inclined and that there may be other portions thereof generally parallel to horizontal 15 or at some other angle. However, at least a portion of the upper run 34 of endless belt 30 must be at an incline angle based on the angle of repose of the objects to provide for effective separation of objects 31 from fines 32 of the feed mixture 18. For example, a lower region of the endless belt 30 towards the lower end 54 may be at an angle different than angle of incline 60 and may even be substantially parallel to horizontal 15.

Support structure 79, in addition to including a suitable structure for holding the endless belt 30 at incline 60, further includes elements for supporting rollers 120. Rollers 120 are positioned for maintaining the base section 40 of endless belt 30 in a substantially planar configuration as it is moved up the incline. Such support rollers 120 shall be described further herein with reference to FIGS. 7A-7B.

Generally, the fines removal apparatus 12 according to the present invention may be configured in any manner using any type of support structure 79 for supporting at least a portion of the endless belt 30 at an incline angle 60 while allowing rotation of the endless belt 30 up the incline. The functions of the upper roller 74 and the lower roller 72 may be provided by any elements which are suitable for maintaining at least a portion of the endless belt 30 at an incline position and for allowing movement of the endless belt 30 up the incline in the direction of arrow 17. Further, the support structure 79 may be configured to allow for ease of movement of the fines removal apparatus 12 from location to location. For example, the support structure 79 may include wheels 700 or other like rotational apparatus that allows the fines removal apparatus 12 to be pulled, loaded on another vehicle more easily, etc.

In FIG. 1, arrow 17 also gives the direction of rotation of rollers 74, 72. A roller as used herein may include any curved surface at the lower region 54 and upper region 52 which allows for the rotation of endless belt 30. For example, a roller as used herein may be an element having a curved surface which is in a fixed position. As such, the rollers 74, 72 may not be used for providing rotation of the endless belt 30, but a drive mechanism that mechanically moves the endless belt 30 about such fixed elements may be required. Further, if the rollers are fixed curved surfaces, the longitudinal axes 84, 86 would be the longitudinal axis of a cylinder on which such curved surfaces would lie. The present invention contemplates the use of any components for moving the endless belt 30 up an incline relative to horizontal 15 and is in no manner limited to the illustrative components shown and/or described herein.

It will be recognized by one skilled in the art that the number of rollers about which the endless belt 30 moves may include rollers in addition to the upper end and lower end rollers 74, 72. For example, the endless belt 30 may rotate about an additional roller located at a position below the upper end roller 74 (e.g., forming a triangular-shaped endless belt when the belt is positioned about such rollers). Such an additional roller may be used to further provide additional belt tension or may provide any other desirable functionality for the fines removal apparatus 12. However, preferably, the endless belt 30 is positioned for rotation around two rollers separated by a predetermined distance, with one of the rollers positioned at a first distance above horizontal 15 which is greater than a distance between the other roller and horizontal 15 to provide an appropriate incline.

As shown in FIGS. 2-5, endless belt 30 includes a base section 40 having an upper major surface 140 and a lower major surface 141. The endless belt 30 further includes the two sidewalls 36, 38 extending from the upper major surface 140 of the base section 40 to define channel 42 therebetween. Lower major surface 141, at least in one embodiment, is for direct contact with the rollers 74, 72 as the endless belt 30 is rotated thereabout.

Generally, the endless belt 30 may include any configuration of a base section and sidewalls that would define a channel 42 for receiving feed mixture 18 and which provides a channel having a depth sufficient for receiving the feed mixture 18 from feed outlet 44 of feed source 28. One skilled in the art will recognize that any configuration for feed source 28 may be used to provide the feed mixture into channel 42.

In one embodiment, the sidewalls 36, 38 extend substantially vertically from the upper major surface 140 of endless base section 30. However, such sidewalls may not extend vertically from base section 30 but rather, for example, may extend at an angle relative thereto and take on any configuration, as long as channel 42 is defined between the sidewalls 36, 38.

In one embodiment, as shown in FIGS. 2-5, each sidewall 36, 38 includes a first proximal end 133 and a second distal end 135. The first proximal end 133 is sealed to upper major surface 140 of the base section 40 along the predetermined length of the endless base section 40.

In one embodiment, the sidewalls 36, 38 are flexible sidewalls. As used herein, flexible sidewalls refer to sidewalls which have an expanded length that is greater than its effective length. In other words, the sidewalls expanded length (e.g., the length of the sidewall if the sidewall were flattened into a plane of material), i.e., expanded length along distal end 135, is less than the sidewalls effective length (e.g., the length along the direction of travel of belt 30) which is occupied by the sidewall. As such, the second distal end 135 of the sidewalls can be flexed to a length that exceeds the predetermined length of the endless base section 40 which is substantially the same length as the effective length of a sidewall 36, 38 because the sidewalls extend along the entire length of the base section 40. With such flexibility, as the endless belt 30 is moved over and around rollers 74, 72, the distal end 135 of the sidewalls 36, 38 is expandable to a state such that damage to the sidewalls 36, 38 does not occur. This is particularly advantageous where high sidewalls are necessary for providing a desirable large volume of material in channel 42. For example, in one embodiment, the sidewalls have a height ($H_{sw}$) that is greater than 3 times the maximum cross-section dimension of the objects 31 of the feed mixture 18. The height ($H_{sw}$) is measured perpendicularly from the base section 40 to the distal end 135 of the sidewalls 36, 38.

Although the sidewalls 36, 38 may be constructed as any flexible sidewalls which can be moved about the rollers 74, 72 without being damaged, in one embodiment, the endless belt 30 includes corrugated sidewalls as is clearly shown in the detailed top view of FIG. 3. As used herein, corrugated refers to a structure having multiple folds therein. Such folds may be creased folds but are, in one embodiment, rolling folds, such as shown in FIG. 3. For example, such an endless belt with raised corrugated sidewalls is available from American Bulk Conveying (Murray Hill, N.J.) under the trade designation of Corra-Trough Belting.

The number of folds in the corrugated structure may be preferably in the range of about 4 per foot to about 24 per foot. However, such folds may be of different sizes, and the number of folds per unit length may vary along the sidewall. For example, various corrugated structures are shown in U.S. Pat. No. 4,109,784 to Hartmann entitled "Conveyor belt with corrugated sidewalls," issued 29 Aug. 1978.

Figure 10A:
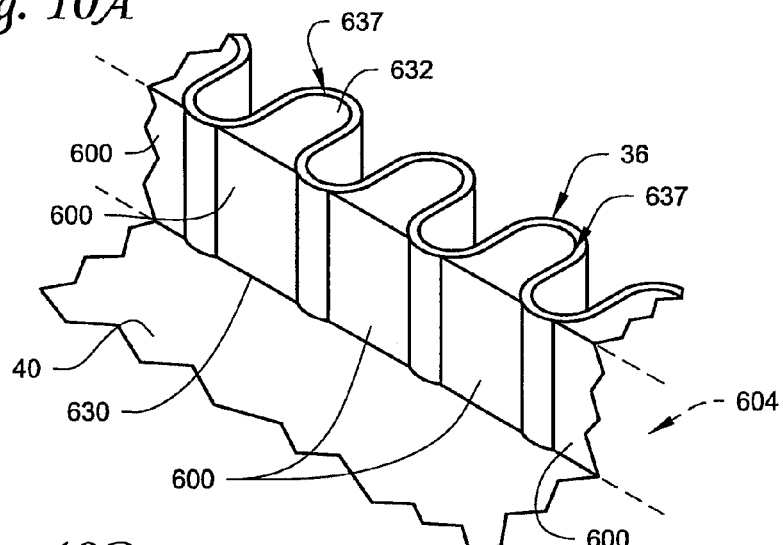
FIG. 10A shows a perspective view of a portion of a flexible sidewall of an endless belt including deflection elements positioned relative thereto according to the present invention for creating a substantially flat sidewall.
Figure 10B:
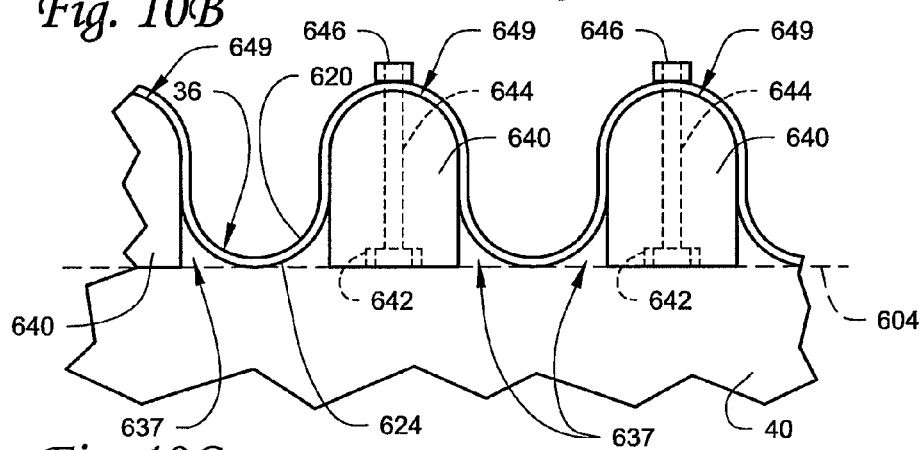
FIGS. 10B-10C show top views of two alternate illustrative embodiments of deflection elements positioned relative to a flexible sidewall such as shown generally in FIG. 10A.
Figure 10C:
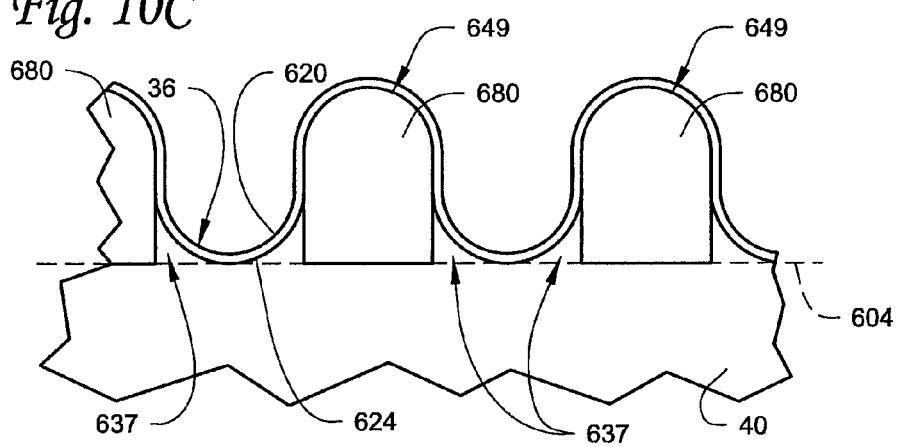
Figure 11B:
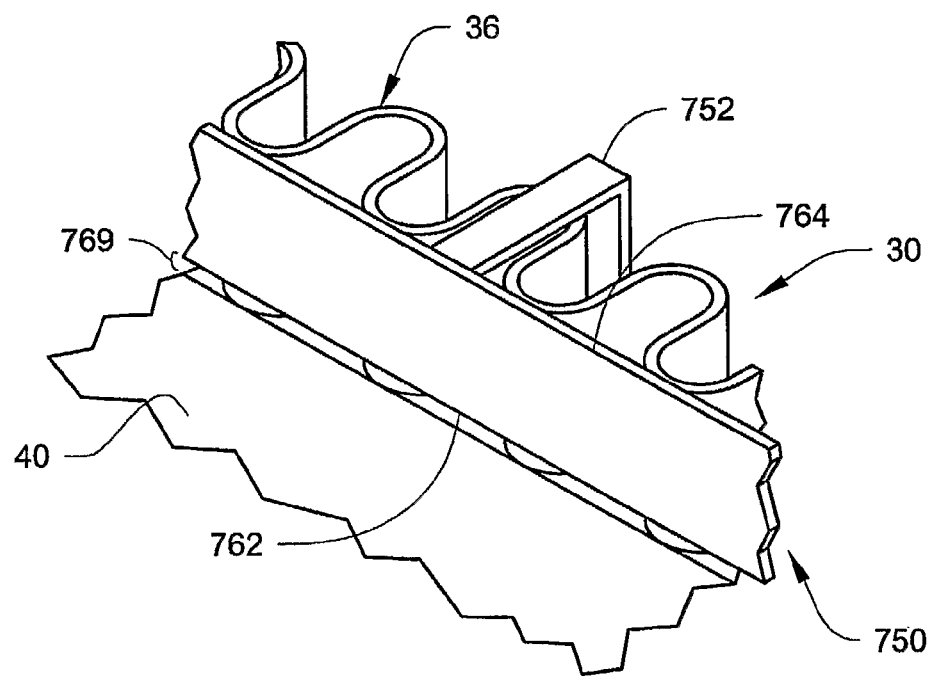

In one embodiment, where the sidewalls 36, 38 are flexible sidewalls, and particularly where the flexible sidewalls are corrugated sidewalls as shown in the top view of FIG. 3, the flexible sidewalls 36, 38 (e.g., corrugated sidewalls) are configured or modified to create substantially flat sidewalls at the interior of the endless belt 30 defining channel 42 as shown in FIGS. 10A-10C, and/or the system is modified to create such substantially flat sidewalls at the interior of the endless belt 30 defining channel 42 such as shown in FIGS. 11A-11B. In other words, deflection elements are positioned relative to openings or cavities defined by the flexible sidewall to create substantially flat sidewalls at the interior of the endless belt 30 defining channel 42.

FIG. 10A shows a portion of the flexible sidewall 36 of the endless belt 30 having deflection elements 600 positioned and/or otherwise located in openings 602 (e.g., cavities, channels, etc.) of the flexible sidewall 36 to create a substantially flat sidewall at the interior of the endless belt 30 defining channel 42 (e.g., along a length of the channel 42, and at least in one embodiment along the entire length of the endless belt).

One or more various configurations or modifications may be suitable to provide the substantially flat flexible walled endless belt. For example, interior side wall openings (e.g., cavities) of the flexible (e.g., corrugated) sidewalls may be filled with plug elements as will be described with reference to FIG. 10B. Further, for example, the side wall openings (e.g., cavities) of the flexible (e.g., corrugated) sidewalls may be filled with plug material (e.g., molded with the sidewall) during the manufacturing of the sidewall as described with reference to FIG. 10C.

In other words, the endless belt 30 is created with substantially flat vertical sidewalls 604. As described herein, the vertical flexible (e.g., corrugated) sidewalls allow the sidewalls to flex as they travel over and around rollers 74, 72 such that damage to the sidewalls 36, 38 does not occur. In conventional use of conveyors, typical desired transport of materials is from the bottom of the conveyor to the top of the conveyor. As such, it does not matter to the conveyor user if materials get caught in the side wall openings or cavities created by corrugated vertical side walls as it is desired for the materials to get transported off the top of the conveyor. However, in accordance with the present invention, it is desirable that the objects 31 to be collected flow to the bottom of the endless belt 30. As such, the use of deflection elements 600 (e.g., filler material) in the openings of the flexible sidewall (e.g., cavities of the corrugated sidewall) effectively blocks the possibility of objects getting caught in the sidewalls 36, 38 and undesirably carried to the top of the endless belt 30. In one or more embodiments, the deflection elements 600 may be filler material attached, or otherwise in a fixed position, adjacent the sidewalls 36, 38 such that the flexibility and stretching of the sidewalls (e.g., corrugated sidewalls) is not affected as the flexible sidewalls 36, 38 travel over and around rollers 74, 72.

At least one purpose of the inclined endless belt 30 is to roll the larger sized objects to the lower region 54 while segregating and passing the fines to the upper region 52 and off the endless belt 30. As such, it is not desirable to have the larger objects get caught in the sidewalls and passed off the top of the endless belt 30 with the fines. To prevent this from occurring, a substantially flat sidewall 604 is created so the larger objects only flow down the endless belt 30 as desired according to the present invention. As used herein, substantially flat sidewall refers to a sidewall that, although it may be formed of multiple components, is planar to the extent that objects rolling down the endless belt 30 would not be caught in sidewalls. In other words, as shown in the exemplary embodiments described herein, there may be small portions or openings of the flat sidewall that, although they are a deviation from the formation of a planar surface, are of a size that does not impede the rolling of objects down the extended belt 30.

One will recognize, as shown in FIG. 10A, that the deflection elements 600 which are positioned with a first end 630 adjacent to the base section 40 of the endless belt 30 may extend such that second end 632 of the deflection elements 600 is the same height as the sidewall 36. However, the height of the deflection elements 600 may be such that the second end 632 is at a height that is only 70 percent of the height of the sidewall 36. Further, the second end 632 may be at a height that is only 50 percent of the sidewall 36, and even as low as 20 percent of the height of the sidewall 36, while still being effective in establishing a substantially flat sidewall along at least a portion of the channel 42 adjacent the base section 40.

As indicated above, two exemplary embodiments of deflection elements are shown in FIGS. 10B and 10C. FIG. 10B shows a portion of corrugated sidewall 36 of the endless belt 30 that includes an outer surface 620 facing opposite an inner surface 624 that defines a portion of channel 42. The sidewall 36 extends vertically from base section 40. The corrugated sidewall 36 includes multiple folds therein that create interior side wall openings or cavities 637.

Further as shown in FIG. 10B, plug elements 640 configured to substantially fill the cavities 637 are affixed therein to form the substantially flat sidewall 604. The plug elements 640 may be formed of any suitable material, such as, for example, rubber or urethane.

In one embodiment, each of the plug elements 640 may be fastened into the cavities 637 by one or more bolts 644 and nuts 646 (e.g., two bolts with one at the top and bottom of the plug element 640). The head of the bolts 644 are countersunk in recesses 642 defined in each plug element 640 to reduce the likelihood of interference with objects rolling down the endless belt 30. One will recognize that any number or types of fastening apparatus may be used to fasten the plug elements 640 in the cavities 637 such that they are fixed therein. For example, adhesives, mechanical fasteners, or any other affixing structures may be used.

In one embodiment, the method of affixing the plug elements 640 into the cavities 637 is performed such that only a certain portion of the plug element 640 is affixed to the inner surface 624 defining cavities 637. For example, as shown in FIG. 10B, the plugs 640 are fastened in two places onto the inner surface 624 at the back regions 649 of the cavities 637 created by the corrugation. By affixing the plug elements 640 only to the back region 649 (e.g., not side regions) of the cavities 637, the corrugation material is still allowed to freely flex as it travels around the rollers 72, 74, while the plug elements 640 stay in place at the center of the cavities 637 (e.g., U-shaped cavities). The plug elements 640 and portions of the sidewall 36 form the substantially planar flat sidewall 604, preferably along the entire length of the endless belt 30.

FIG. 10C also shows a portion of corrugated sidewall 36 of the endless belt 30 that includes outer surface 620 facing opposite inner surface 624 that defines a portion of channel 42. The sidewall 36 extends vertically from base section 40. The corrugated sidewall 36 includes multiple folds therein that create interior side wall openings or cavities 637.

Further as shown in FIG. 10C, the sidewall 36 is molded, or otherwise manufactured, to contain plug material 680 that substantially fills the cavities 637. In other words, unlike shown in FIG. 10B where plug elements 640 are affixed in the cavities 637, the plug material 680 may be integral with the sidewall 36 to form the substantially flat sidewall 604. The plug material 680 may be the same material as or be different material than the material forming the sidewall 36 (e.g., rubber).

In one embodiment, the plug material 680 is connected with the sidewall 36 only at the back regions 649 of the cavities 637 created by the corrugation. In this manner, the corrugation material is still allowed to freely flex as it travels around the rollers 72, 74, while the plug material 680 stays in place at the center of the cavities 637 (e.g., U-shaped cavities).

Still further, the substantially flat sidewalls may be provided with the use of one or more skirt deflection elements 750 positioned adjacent to the openings or cavities of the sidewalls 36 and 38 as shown in FIGS. 11A and 11B. At least in one embodiment, such skirt deflection elements 750 are supported above the endless base section 40 and separate from the first and second sidewalls 36 and 38.

FIGS. 11A-11B show the generalized top plan view illustrative of the endless belt of the fines removal apparatus shown generally in FIGS. 1 and 2 with the one or more skirt deflection elements 750 positioned relative to the sidewalls 36 and 38 of the endless belt 30, and a perspective view of a portion of the skirt deflection element 750 positioned relative to a sidewall 36 of the endless belt 30, respectively. As shown in FIG. 11A, the skirt deflection elements 750 extend between a first end 756 and a second end 758. At least in one embodiment, the first ends 756 of the skirt deflection elements 750 are positioned adjacent the sidewalls 36 and 38 at the upper end 52 of the endless belt 30 and the second ends 758 of the skirt deflection elements 750 are positioned adjacent the sidewalls 36 and 38 at the lower end 54 of the endless belt 30.

In one embodiment, the skirt deflection elements 750 are held in position adjacent the sidewalls 36 and 38 by external support apparatus 752 (e.g., coupled to support structure 79 used to support the endless belt 30). For example, the external support apparatus 752 may include any suitable structural elements and connection mechanisms, such as, clamps, straps, angle iron, etc. By affixing the skirt deflection elements 750 separated from the sidewalls, the flexible sidewalls 36, 38 are allowed to freely flex as they travel around the rollers at the lower end 54 and upper end 52.

As shown in FIG. 11A and 11B, the stationary skirt deflection elements 750 extend from a lower edge portion 762 to an upper edge portion 764 along the length thereof from the first end 756 to the second end 758. In one embodiment, the deflection elements 750 extend substantially (i.e., greater than 90 percent) the entire length of the upper run from the lower end 54 to the upper end 52 of the endless belt 30. The skirt deflection elements 750 may be the same height as the sidewalls 36 and 38. However, the height of the deflection elements 750 may be such that the upper edge portion 764 is at a height that is only 70 percent of the height of the sidewall 36. Further, the upper edge portion 764 may be at a height that is only 50 percent of the sidewall 36, and even as low as 20 percent of the height of the sidewall 36, while still being effective in establishing a substantially flat sidewall along at least a portion of the channel 42 adjacent the base section 40.

Further, in one embodiment, the skirt deflection elements 750 are positioned such that the lower edge portion 762 is held just off the base section 40 of the endless belt 30 resulting in the formation of gap 769. The gap 769 is sufficiently large to prohibit the skirt deflection elements 750 from impeding the movement of the endless belt 30. However, the gap 769 is relatively small compared to the objects being processed so as to avoid objects from being caught therein and impeding the flow of objects to the lower end.

The stationary skirt deflection elements 750 may be placed just inside the sidewalls 36 and 38 to define the channel 42 with substantially flat sidewalls. This plugs off the folds or openings of the sidewalls 36, 38 and prevents pellets from getting caught in the folds. The skirt deflection elements 750 may be formed of any suitable material including, but clearly not limited to, plastics such as polyurethane, thin metal sheeting, etc. Further, the deflection elements 750 may be formed of one or more components (e.g., several pieces of sheet material butted together).

Although several configurations of deflection elements are provided herein, one skilled in the art will recognize that various manners of providing for the deflection of objects from the openings defined in the sidewalls may be used according to the present invention.

The upper major surface 140 of base section 40 may be smooth or be textured to assist in the capture of fines and removal thereof. For example, the surface may be uniformly textured with bumps, ridges, surface treatments, diamond patterns, etc. Generally, such treatments are not equivalent to the obstruction elements described herein, but are treatments that have a thickness that is less than about ¼ the thickness of objects being separated and extend over substantially the entire surface 140 of the base section 40 (i.e., substantially the entire surface 140 referring to 70 percent or more of the surface 140).

Further, as shown in FIGS. 2-5, the endless belt 30 includes a pattern of obstruction elements 70 positioned on the upper major surface 140 of the endless base section 40. In one exemplary embodiment, each obstruction element 70 includes a surface portion 71 that extends between a first position 151 and a second position 152 of the endless base section 40 such that the surface portion 71 impedes a flow of fines 32 down the incline when feed mixture 18 is provided in the channel 42 and as the portion of the endless belt 30 is moved up the incline.

Further, in at least one exemplary embodiment, the surface portion 71 is non-orthogonal relative to the predetermined length of the endless base section 40. In at least another exemplary embodiment, the surface portion 71 of each obstruction element 70 includes a surface position at an angle 158 relative to a plane 159 extending across a width (W) of the endless belt and orthogonal to the length of the endless base section 40. In one embodiment, the angle 158 relative to the plane 159 extending across the width (W) of the endless belt 30 and orthogonal to the length of the endless belt 30 is greater than the angle of repose for the objects 31 to be processed but less than an angle of repose associated with the fines 32.

As shown in the illustrative embodiment of FIGS. 2-5 (but best seen in FIG. 3), the pattern of obstruction elements 70 includes a first set of elongated obstruction elements 166 extending downward at an angle relative to the first sidewall 36 and partially across a width of the endless belt 30, and a second set of elongated obstruction elements 167 extending downward at an angle relative to the second sidewall 38 and partially across the width of the endless belt 30. The first and second sets of elongated obstruction elements 166, 167 are provided in an alternating arrangement such that a continuous S-flow pattern is defined thereby. In one embodiment, the angle 158 associated with each of the first and second sets 166, 167 of elongated obstruction elements 70 is an angle relative to a plane extending across the width (W) of the endless belt 30 and orthogonal to the length of the endless base section 40. The angle 158 is greater than the angle of repose for the objects to be processed but less than the angle of repose associated with the fines.

With use of such obstruction elements 70 in an alternating arrangement such that a continuous S-flow pattern 190 is defined, the fines removal apparatus 12 physically translates a vibration and S-shaped swirling, somewhat aggressive movement, into a thick bed of objects (e.g., iron ore pellets) moving down the endless belt 30 (e.g., conveyor belt) to cause the fines 32 to be stratified and forced downward to the surface 140 of the base section of the endless belt 30. In other words, the fines are forced downward through void spaces 198 between the objects 31 (e.g., iron ore pellets) in the bed of objects 31. The fines 32 are picked up by the angled obstruction elements (e.g., cleats) fixed to the belt surface 140 and are then moved off to the first end portion 52 for discharge. The shaking, swirling action is created by the obstruction elements 70 and the force created by the downward movement of the bed of objects 31 over the angled obstruction elements 70.

Such movement of the objects 31 and fines 32 is quite different than conventional technologies that provide a physical shaking action through physical shaking motion arms and other devices which may take the form of a shaking table or a series of tables to provide a separation force. The present invention does not use physical shaking equipment to force the size stratification to occur but rather transfers the moving force of the bed of objects 31 down the upper run 34 of the endless belt 30 and over or about the obstruction elements 70 to create the upward shaking action to cause stratification of the different sized constituents or particles of the feed mixture 18. In other words, the fines removal apparatus 12 relies on particle size, bulk density, and particle shape to motivate the physical separation and does not rely on specific gravity to provide the separation forces required to cause particle separation.

The obstruction elements 70 may have variable widths and heights and also may be designed to be in variable positions. At least in one embodiment, the obstruction elements 70 have a height ($H_{ob}$) that is dependent upon the application in which the fines removal apparatus 12 is used. For example, in one embodiment, the thickness or height ($H_{ob}$) of each obstruction element 70, as measured perpendicularly from the upper major surface 140 of the endless base section 40, is 50% or less than a maximum cross-section dimension of the objects 31 of the feed mixture 18 being processed. In certain cases, such obstruction elements 70 may have a thickness or height ($H_{ob}$) that is 25% or less than a maximum cross-section dimension of the objects 31 of the feed mixture 18 being processed.

The obstruction elements may be formed of any suitable materials. In one or more embodiments, the obstructions elements 70 may be formed of rubber, urethane, or any other wear-resistant material.

The pattern of obstruction elements are, at least in one embodiment, generally positioned along the entire length of the base section 40. The obstruction elements 70 may be fixed to the upper major surface 140 of the base section 40 using any suitable technique. For example, such obstruction elements may be fixed to the surface 140 by gluing, bolting, vulcanizing, etc.

The pattern of obstruction elements 70 may take one of any number of configurations. For example, as described herein with reference to FIGS. 2-5, a first and second set of obstruction elements 166, 167 are used to provide an S-shaped flow pattern 190. However, dependent on the application and the size of the endless belt (e.g., width (W) thereof), various patterns may be used.

For example, FIG. 6 is a generalized top plan view illustrative of an exemplary embodiment of an endless belt 200 that may be used in the fines removal apparatus 12 shown generally in FIGS. 1-2 according to the present invention. The endless belt 200 includes endless base section 202 and sidewalls 204, 206 that form a channel 208 for receiving feed mixture 18.

A pattern 210 of obstruction elements 212 are provided on the base section 202. As shown therein, multiple like obstruction elements 212 are provided side by side across the width (W) of the endless belt 200. Each of the multiple obstruction elements 212 include surfaces 213 that extend between a first position 220 and a second position 221 of the endless base section 202 such that it impedes a flow of fines down the incline when feed mixture 18 is provided in the channel 208 and as the portion of the endless belt 200 is moved up the incline. Further, the surface 213 is non-orthogonal relative to the length of the endless base section 202. Yet further, the surface 213 is positioned at an angle 230 relative to a plane extending across a width (W) of the endless belt 200 and orthogonal to the length of the endless base section 202. Yet further, the angle 230, in this exemplary embodiment, is greater than the angle of repose for the objects to be processed but less than an angle of repose associated with fines of the feed mixture 18. As shown in FIG. 6, multiple S-flow patterns 240 are created across the width (W) of the endless belt 200.

One skilled in the art will recognize that many different configurations of the obstruction element patterns may be used according to the present invention that follow the techniques described herein with reference to the angle of repose theory to provide separation of fines 32 from objects 31 of feed mixture 18. As such, due to the numerous available configurations and the need for simplicity, only a couple of configurations are provided herein. However, various obstruction element patterns utilizing the angle of repose theory are contemplated according to the present invention.

With further reference to FIG. 1, the control system 26 is used for controlling one or more various functions of the fines removal apparatus 12, in addition to controlling drive apparatus 90, for performing separation according to the present invention (e.g., controlling feed source 28 for feeding feed mixture 18 into channel 42 defined by the endless belt 30). For example, control system 26 may be used to control adjustment elements 92 of the fines removal apparatus 12 to adjust the angle of incline 60. For example, support structure 79 may include adjustable elements 92 (e.g., hydraulic elements, electrical elements, or other mechanical type elements) that may be controlled by control system 26 to change the angle of incline 60 before, during, or after use of the fines removal apparatus 12.

The fines removal apparatus 12 may further include a monitoring apparatus 29 for monitoring the fines removal process using one or more suitable techniques. For example, the monitoring apparatus 29 may include an optical pattern recognition camera and/or computer system for use in viewing the fines 32 being removed from the feed mixture 18. The feedback data representing the characteristics of the fines may be provided to control system 26 for use in controlling adjustment elements 92 resulting in a change to incline angle 60 or for control of drive apparatus 90 to control the speed of endless belt 30. In other words, the monitoring apparatus 29, along with other system components, may be used to automatically achieve continuous set point fines separation.

Further, monitoring apparatus 29 may include a manual camera viewing the fines so as to provide a remote display to be located in a control room. The remote display would then physically show real-time fines separation via the remote camera physically attached to the fines removal apparatus 12.

One will understand that the monitoring apparatus 29 may be used to monitor various parameters of the fines removal apparatus 12. For example, the monitoring apparatus 29 may be used at the upper end portion 52 of the fines removal apparatus 12 to view or monitor the fines discharged, or may be used at the lower end 54 to determine whether any fines are being discharged into object collection apparatus 14.

As described above, the adjustment elements 92 may be used to automatically control the incline angle 60. For example, such adjustment elements 92 may be under control of control system 26 based on one or more various parameters of the fines removal apparatus 12. The adjustment elements 92 may include, for example, any hydraulics, pneumatics, or electronics for providing adjustment to the incline angle 60. In other words, the endless belt 30 may be automatically pivoted around pivot point 87 to change incline angle 60.

Yet further, the fines removal apparatus 12, as shown in FIG. 1, may include one or more mechanical assist devices 195 at one or more positions of the fines removal apparatus 12. For example, the mechanical assist device 195 may include an under belt wrapper and/or vibrator to help increase fines separation from objects of the feed mixture being processed. Further, for example, mechanical assist device 195 may include optional belt wipers and/or brushes to wipe off any excess fines sticking to the surface of endless belt 30 at the upper end 52 of the fines removal apparatus 12 when discharge occurs or on the lower run 35 (e.g., at the return stroke of the endless belt). Yet further, mechanical assist device 195 may include a belt water spray device to wash off fines at one or more locations (e.g., at the discharge end 52 of the fines removal apparatus 12), on the lower run 35 or return stroke of the endless belt 30, etc. Further, the mechanical assist device 195 may include off-center rollers for use in causing a bumping action on the belt to further drive smaller particles down to the surface of the belt.

Various enclosures, as represented generally by enclosure 130, may be used in accordance with the fines removal apparatus 12. For example, the enclosure 130 may include a belt cover and dust collector hoods positioned at one or more appropriate places on the belt system to reduce fugitive dust emissions, or may generally involve an enclosure about one or more portions of the endless belt 30 for safety functionality. Further, for example, the feed distribution apparatus 520 (such as shown in FIGS. 9A-9B) may be provided as a part of the enclosure 130, or otherwise connected or associated therewith.

Figure 7A:
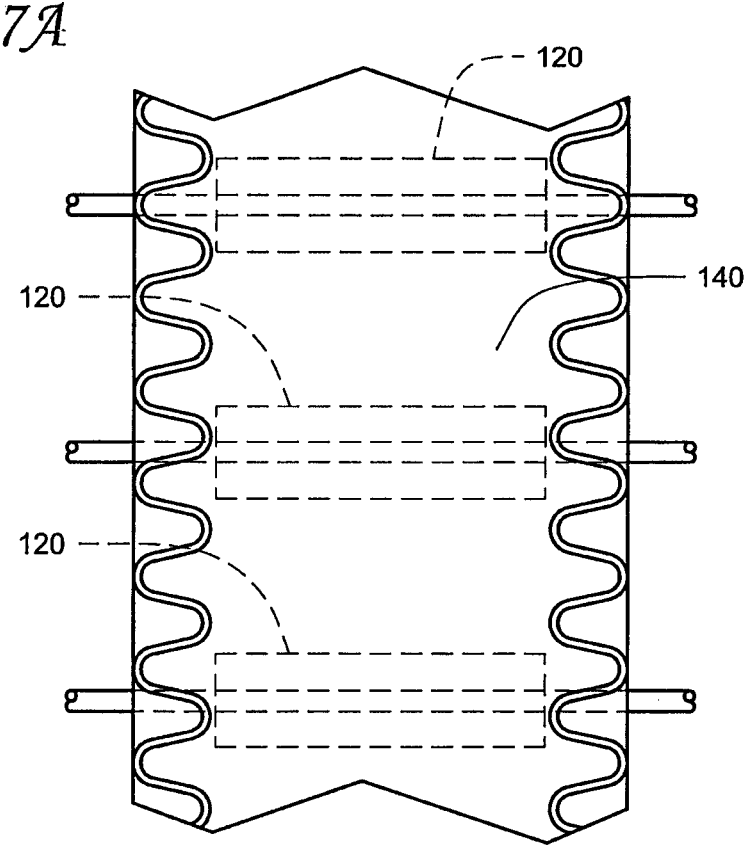
FIGS. 7A-7B show a top plan view of a portion of a roller supported endless belt and a side view thereof, respectively, that may be used in the fines removal apparatus shown generally in FIG. 1 according to the present invention.
Figure 7B:
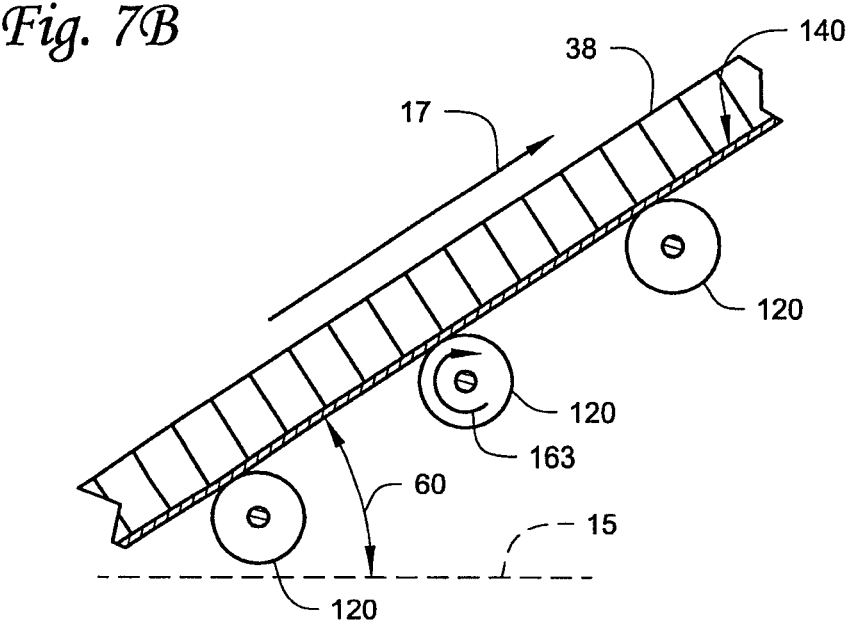

As shown in FIGS. 1-2, and in further detail in FIGS. 7A-7B, the fines removal apparatus 12 may further include a plurality of support rollers 120, or other suitable support structure, to maintain the base section 40 in a substantially planar configuration. As used herein, a substantially planar configuration refers to maintaining the base section 40, or in other words, the upper major surface 140 thereof, in a generally flat configuration with use of support structure. In one embodiment, the support structure includes the support rollers 120 to prevent the surface 140 from deviating from a single plane. With such a planar base section 40, effective use of the angle of repose concepts for separating objects 31 from the feed mixture 18 is accomplished. As shown in FIG. 7A (wherein the obstruction elements 70 are removed for simplicity), a sufficient number of support rollers 120 may be used to maintain base section 40 in a substantially planar configuration as the inclined upper run 34 of the endless belt 30 moves in the direction of arrow 17, as shown in FIG. 7B. Arrow 163 shows the direction of rotation of the rollers during use.

Figure 8:
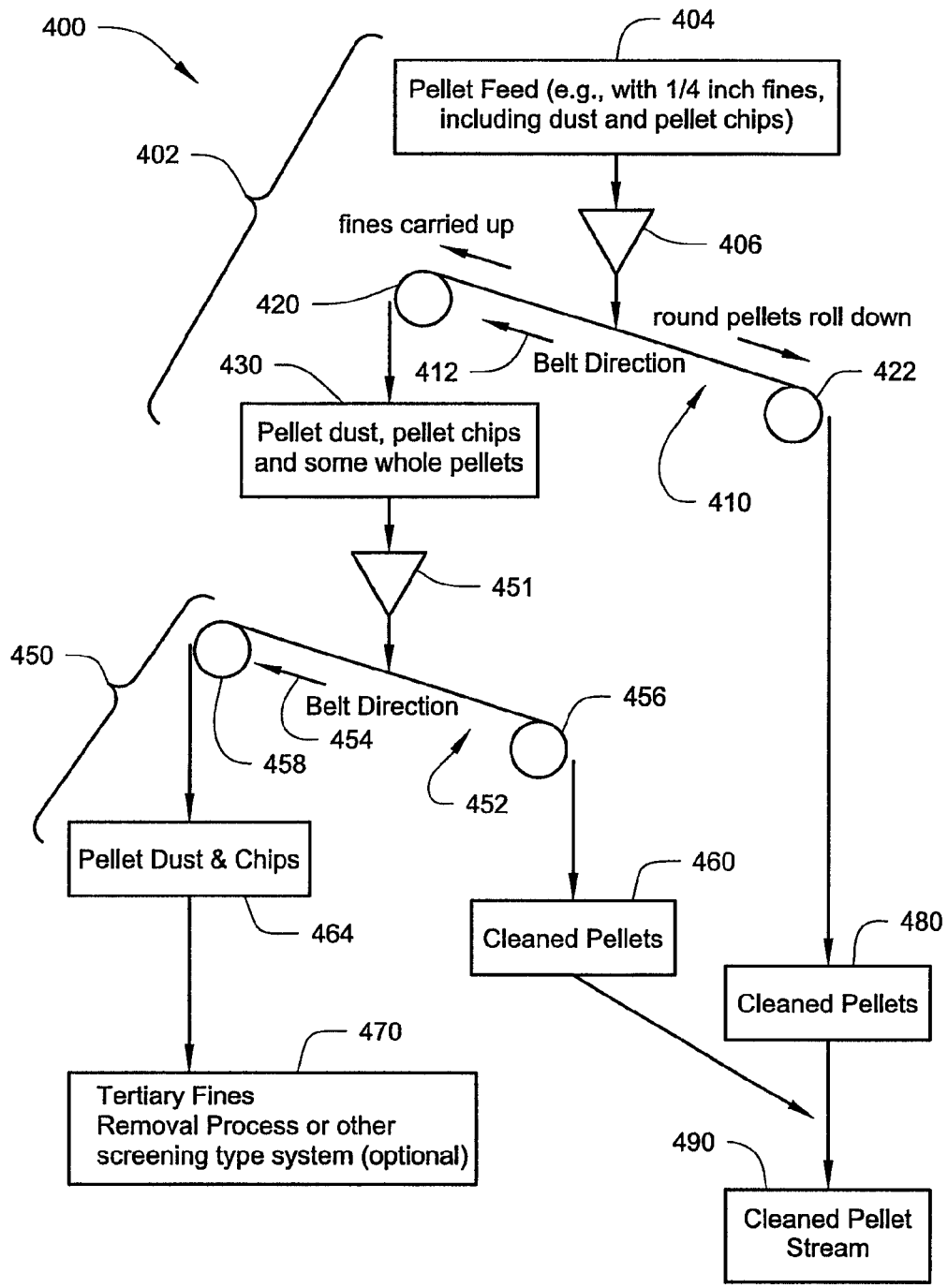
FIG. 8 shows a diagrammatic view of a recovery system for use in separating fines using an apparatus such as that shown in FIGS. 1-7 along with one or more other separation apparatus.

FIG. 8 shows a diagrammatic view of a recovery system 400 that includes a fines removal apparatus 402 in combination with one or more other separation apparatus 450. In other words, a primary and secondary separation apparatus may be used to refine the separation process (e.g., the fines removed using fines removal apparatus 402 is further processed using a secondary separation apparatus 450). The secondary separation apparatus 450 may or may not be a fines removal apparatus such as those described with reference to FIGS. 1-7 (e.g., may be a screening apparatus, shaking table apparatus, etc.).

As shown in FIG. 8, recovery system 402 includes the fines removal apparatus 402. The fines removal apparatus 402 includes a pellet feed source 404 for providing through an inlet 406 a feed mixture to be separated by an endless belt 410 traveling in belt direction 412 around rollers 420, 422. The feed mixture being separated includes, for example, rounded iron-bearing pellets along with, for example, quarter-inch fines including dust and pellet chips. The fines are carried up the incline of the endless belt 410 while the rounded pellets roll down and are discharged as cleaned pellets 480 to be removed from the recovery system 400 in a cleaned pellet stream 490. The fines are carried up the incline and discharged. In certain cases, the fines may include pellet fines, pellet chips, and some whole pellets which were not properly separated by apparatus 402. Such fines are generally represented by block 430 and provided as an input 451 to secondary separation apparatus 450.

In this particular embodiment, separation apparatus 450 also includes an endless belt 452 like that of primary fines removal apparatus 402 which moves in belt direction 454 around rollers 456 and 458. Cleaned pellets of the fines mixture 430 roll down the incline and are provided as cleaned pellets 460 to cleaned pellet stream 490 for removal from the recovery system 400. Fines of the mixture 430 provided to the secondary separation apparatus 450 move up the incline and are discharged, as represented generally by block 464. One or more additional tertiary fines removal processes, or other screened-type systems, may optionally be used, as represented by block 470 on the pellet dust and chips discharged from secondary separation apparatus 450.

All patents, patent documents, and references cited herein are incorporated in their entirety as if each were incorporated separately. This invention has been described with reference to illustrative embodiments and is not meant to be construed in a limiting sense. As described previously, one skilled in the art will recognize that other various illustrative applications may use the techniques as described herein to take advantage of the beneficial characteristics of the concepts and features described herein. Various modifications of the illustrative embodiments, as well as additional embodiments of the invention, will be apparent to persons skilled in the art upon reference to this description.

What is claimed is:

1. A fines removal apparatus for use in separation of objects from a feed mixture, wherein the feed mixture comprises the objects and fines, the apparatus comprising:
    an endless belt, wherein at least a portion of the endless belt is movable up an incline relative to horizontal, wherein the incline is adjustable to an angle relative to horizontal that is greater than an angle of repose associated with the objects but less than an angle of repose associated with the fines, wherein the endless belt comprises:
        an endless base section having a predetermined length, first and second sidewalls, wherein the endless base section and the first and second sidewalls define a channel of the endless belt, wherein the channel is configured to receive the feed mixture therein, wherein each of the first and second sidewalls comprises a flexible sidewall, wherein the flexible sidewall comprises one or more surfaces that define one or more openings adjacent the channel of the endless belt, and further wherein one or more deflection elements are positioned relative to the one or more openings to form substantially flat sidewalls adjacent both sides of the channel and along a length of the channel across a plurality of the one or more openings; and
        a plurality of obstruction elements, wherein each obstruction element comprises at least one surface portion that extends between a first position and a second position of the endless base section such that the at least one surface portion impedes a flow of fines down the incline when feed mixture is provided in the channel and as the portion of the endless belt is moved up the incline; and
    a drive apparatus coupled to the endless belt to move the portion of the endless belt up the incline.

2. The apparatus of claim 1, wherein each of the first and second sidewalls comprises a corrugated sidewall, wherein the corrugated sidewall comprises a plurality of folds that define cavities adjacent the channel of the endless belt, and further wherein one or more deflection elements are positioned relative to the one or more cavities to form the substantially flat sidewalls adjacent the channel.

3. The apparatus of claim 1, wherein the one or more deflection elements comprise plug elements affixed in the one or more openings to form the substantially flat sidewalls adjacent the channel.

4. The apparatus of claim 1, wherein the one or more deflection elements comprise plug material integrally molded with the first and second sidewalls to form the substantially flat sidewalls adjacent the channel.

5. The apparatus of claim 1, wherein the one or more deflection elements comprise a skirt element positioned adjacent the openings to form the substantially flat side walls, wherein the skirt element is supported above the endless base section and separate from the first and second sidewalls.

6. The apparatus of claims 1, wherein a conveyor having a conveyor length is provided, wherein the conveyor is aligned with and positioned below at least a major portion of the endless belt and outward from an upper end of the endless belt such that fines moved up the incline and separated from the objects are carried away and fines undesirably associated with the endless belt as it is returned from the upper end to a lower end thereof are deposited on the conveyor to be carried away.

7. The apparatus of claim 1, wherein the at least one surface portion of each obstruction element is non-orthogonal relative to the length of the endless base section.

8. The apparatus of claim 1, wherein each obstruction element has a thickness that is 50 percent or less than a maximum cross-section dimension of the objects of the feed mixture.

9. The apparatus of claim 1, wherein the at least one surface portion of each obstruction element comprises a surface positioned at an angle relative to a plane extending across a width of the endless belt and orthogonal to the length of the endless base section.

10. The apparatus of claim 9, wherein the angle relative to the plane extending across the width of the endless belt and orthogonal to the length of the endless belt is greater than the angle of repose for the objects to be processed but less than an angle of repose associated with the fines.

11. The apparatus of claim 1, wherein the feed mixture comprises rounded iron bearing pellets.

12. The apparatus of claim 1, wherein the first and second sidewalls of the endless belt extend from the base section of the endless belt a predetermined distance measured perpendicularly from the base section to a distal end of the first and second sidewalls, and further wherein the predetermined distance is greater than 3 times the maximum cross-section dimension of the objects of the feed mixture.

13. The apparatus of claim 1, wherein the incline is at an angle relative to horizontal that is greater than an angle of repose associated with the objects but less than 5 degrees more than the angle of repose associated with the objects.

14. The apparatus of claim 1, wherein the apparatus further comprises a feed distributor apparatus comprising a plurality of distributor elements configured to provide a distribution of the objects across substantially an entire width of the endless belt, the width being orthogonal to the predetermined length.

15. The apparatus of claim 1, wherein each of the first and second sidewalls includes a first proximal end sealed to the base section along the predetermined length and a second distal end, and further wherein the first and second sidewalls comprise the flexible sidewalls such that the second distal end is expandable to a length that exceeds the predetermined length of the base section.

16. A method for use in separation of objects from a feed mixture, wherein the feed mixture comprises the objects and fines, the method comprising:
    moving at least a portion of an endless belt up an incline between a first position and a second position, wherein the second position is elevated with respect to the first position, wherein the incline is at an angle relative to horizontal that is greater than an angle of repose associated with the objects but less than an angle of repose associated with the fines, wherein the endless belt comprises an endless base section;
    providing first and second sidewalls, wherein the endless base section and the first and second sidewalls define a channel;
    providing a plurality of obstruction elements, wherein each obstruction element comprises at least one surface portion that extends between a first position and a second position of the endless base section such that the at least one surface portion impedes a flow of the fines down the incline when feed mixture is provided in the channel and as the portion of the endless belt is moved up the incline, wherein the at least one surface portion is non-orthogonal relative to the length of the endless base section, and further wherein each obstruction element has a thickness that is 50 percent or less than a maximum cross-section dimension of the objects of the feed mixture; and receiving the feed mixture within the channel, wherein the objects of the feed mixture flow downward toward the first position and the fines move upward toward the second position as the at least a portion of the endless belt is moved up the incline.

17. The method of claim 16, wherein the at least one surface portion of each obstruction element comprises a surface positioned at an angle relative to a plane extending across a width of the endless belt and orthogonal to the length of the endless base section, and further wherein the angle relative to the plane extending across the width of the endless belt and orthogonal to the length of the endless belt is greater than the angle of repose for the objects to be processed but less than an angle of repose associated with the fines.

18. The method of claim 16, wherein the plurality of obstruction elements comprises a first set of elongated obstruction elements extending downward at an angle relative to the first sidewall and partially across a width of the endless belt and a second set of elongated obstruction elements extending downward at an angle relative to the second sidewall and partially across the width of the endless belt, wherein the first and second sets of elongated obstruction elements are provided in an alternating arrangement such that a continuous "S" flow pattern is defined thereby.

19. The method of claim 18, wherein the angle associated with each of the first and second sets of elongated obstruction elements is an angle relative to a plane extending across a width of the endless belt and orthogonal to the length of the endless belt, and further wherein the angle is greater than the angle of repose for the objects to be processed but less than an angle of repose associated with the fines.

20. The method of claim 16, wherein the method further comprises maintaining the endless base section of the at least a portion of the endless belt moving up the incline in a substantially planar configuration.

21. The method of claim 16, wherein the endless base section further comprises a textured surface for contact with the feed mixture.

22. The method of claim 16, wherein the feed mixture comprises rounded iron bearing pellets.

23. The method of claim 16, wherein each of the first and second sidewalls of the endless belt include a first proximal end proximate at least a portion of the base section of the endless belt and a second distal end located a predetermined distance measured perpendicularly from the base section, and further wherein the predetermined distance is greater than 3 times the maximum cross-section dimension of the objects of the feed mixture.

24. The method of claim 16, wherein each of the first and second sidewalls comprises a skirt element supported above at least a portion of the endless base section.

25. The method of claim 16, wherein each of the first and second sidewalls include a first proximal end sealed to the base section along the predetermined length and a second distal end, and further wherein the first and second sidewalls are flexible sidewalls such that the second distal end is expandable to a length that exceeds the predetermined length of the base section.

26. The method of claim 16, wherein each of the first and second sidewalls comprises a substantially flat sidewall.

27. The method of claim 16, wherein the method further comprises:

monitoring one or more characteristics of the fines removed from the feed mixture and providing an output representative of such monitoring; and adjusting the speed of the endless belt and/or the angle of incline based on the output.

28. The method of claim 16, wherein the incline is at an angle relative to horizontal that is greater than an angle of repose associated with the objects but less than 5 degrees more than the angle of repose associated with the objects.

29. The method of claim 16, wherein the thickness of the obstruction elements is one quarter inch or less.

30. A method for use in separation of iron bearing objects having a similar size and shape from a feed mixture, wherein the feed mixture comprises the iron bearing objects and fines, and further wherein the iron bearing objects have a rounded shape and the fines have a constituent size that occupies less than one half the volume in space occupied by one of the iron bearing objects, the method comprising:

providing an endless belt comprising an endless base section having a predetermined length;

providing first and second sidewalls, wherein the endless base section and the first and second sidewalls define a channel;

providing a plurality of elongated obstruction elements that extend between a first position and a second position of the endless base section such that the plurality of elongated obstruction elements impede a flow of the fines down the incline when feed mixture is provided in the channel and as the portion of the endless belt is moved up the incline, wherein each of the plurality of elongated obstruction elements is positioned non-orthogonal relative to the length of the endless base section and extends partially across a width of the endless belt;

moving at least a portion of the endless belt up an incline between a first position and a second position, wherein the second position is elevated with respect to the first position;

positioning the endless belt such that the incline is at an angle relative to horizontal that is greater than an angle of repose associated with the iron bearing objects but less than an angle of repose associated with the fines;

receiving the feed mixture within the channel;

allowing at least some of the iron bearing objects of the feed mixture to flow downward toward the first position over the elongated obstruction elements as the at least a portion of the endless belt is moved up the incline;

impeding the downward flow of the fines toward the first position using the elongated obstruction elements as the at least a portion of the endless belt is moved up the incline; and moving the fines upward toward the second position using the elongated obstruction elements as the at least a portion of the endless belt is moved up the incline.

31. The method of claim 30, wherein the method further comprises allowing at least some of the iron bearing objects to flow along one or more of the elongated obstruction elements positioned at an angle, relative to a plane extending across the width of the endless belt and orthogonal to the length of the endless base section, that is greater than the angle of repose for the iron bearing objects but less than an angle of repose associated with the fines.

32. The method of claim 30, wherein the plurality of elongated obstruction elements comprises a first set of elongated obstruction elements extending downward at an angle relative to the first sidewall and partially across a width of the endless belt and a second set of elongated obstruction elements extending downward at an angle relative to the second sidewall and partially across the width of the endless belt, wherein the first and second sets of elongated obstruction elements are provided in an alternating arrangement such that a continuous "S" flow pattern is defined thereby.

33. The method of claim 32, wherein the angle associated with each of the first and second sets of elongated obstruction elements is an angle, relative to a plane extending across a width of the endless belt and orthogonal to the length of the endless belt, that is greater than the angle of repose for the iron bearing objects to be processed but less than an angle of repose associated with the fines.

34. The method of claim 30, wherein the method further comprises maintaining the endless base section of the at least a portion of the endless belt moving up the incline in a substantially planar configuration using a plurality of rollers positioned between the first position and the second position.

35. The method of claim 30, wherein each of the first and second sidewalls comprise a first proximal end proximate the endless base section and a distal end at a predetermined distance measured perpendicularly from the base section, and further wherein the predetermined distance is greater than 3 times the maximum cross-section dimension of the iron bearing objects of the feed mixture.

36. The method of claim 30, wherein each of the first and second sidewalls comprises a skirt element supported above at least a portion of the endless base section.

37. The method of claim 30, wherein each of the first and second sidewalls includes a first proximal end sealed to the base section along the predetermined length and a second distal end, and further wherein the first and second sidewalls are flexible sidewalls such that the second distal end is expandable to a length that exceeds the predetermined length of the base section.

38. The method of claim 30, wherein each of the first and second sidewalls comprises a substantially flat sidewall.

39. The method of claim 30, wherein the method further comprises:
monitoring one or more characteristics of the fines removed from the feed mixture and providing an output representative of such monitoring; and
adjusting the speed of the endless belt and/or the angle of incline based on the output.

40. The method of claim 30, wherein positioning the endless belt comprises setting the incline at an angle relative to horizontal that is greater than an angle of repose associated with the iron bearing objects but less than 5 degrees more than the angle of repose associated with the iron bearing objects.

41. The method of claim 30, wherein the iron bearing objects comprise one half inch rounded iron bearing pellets, and further wherein impeding the downward flow of the fines toward the first position comprises using the elongated obstruction elements having a thickness that impedes the flow of fines having a constituent size that occupies less than one half the volume in space occupied by one of the iron bearing objects.

42. The method of claim 30, wherein the elongated obstruction elements have a thickness that is one quarter inch or less.

43. A method for use in separation of objects from a feed mixture, wherein the feed mixture comprises the objects and fines, wherein the fines have a constituent size that occupies less than one half the volume in space occupied by one of the objects, the method comprising:
providing a belt comprising a base section having a length;
providing first and second sidewalls, wherein the base section and the first and second sidewalls define a channel;
providing a plurality of elongated obstruction elements, wherein each of the elongated obstruction elements extends between a first position and a second position of the base section, and further wherein each of the elongated obstruction elements is non-orthogonal relative to the length of the base section and extends partially across a width of the belt;
moving at least a portion of the belt up an incline between a first position and a second position, wherein the second position is elevated with respect to the first position;
receiving the feed mixture within the channel;
allowing at least some of the objects of the feed mixture to flow downward toward the first position over the elongated obstruction elements and forcing the fines downward toward the base section as the at least a portion of the belt is moved up the incline;
impeding the downward flow of the fines toward the first position using the elongated obstruction elements as the at least a portion of the belt is moved up the incline; and
moving the fines upward toward the second position using the elongated obstruction elements as the at least a portion of the belt is moved up the incline.

44. The method of claim 43, wherein impeding the downward flow of the fines toward the first position comprises using elongated obstruction elements having a thickness that impedes the flow of fines having a constituent size that occupies less than one half the volume in space occupied by one of the objects.

45. The method of claim 44, wherein allowing at least some of the objects of the feed mixture to flow downward toward the first position comprises setting the incline at an angle relative to horizontal that is greater than an angle of repose associated with the objects but less than an angle of repose associated with the fines.

46. The method of claim 45, wherein setting the incline comprises setting the incline at an angle relative to horizontal that is greater than an angle of repose associated with the objects but less than 5 degrees more than the angle of repose associated with the objects.

47. The method of claim 43, wherein the method further comprises allowing at least some of the objects to flow along one or more of the elongated obstruction elements positioned at an angle, relative to a plane extending across the width of the belt and orthogonal to the length of the base section, that is greater than the angle of repose for the objects but less than an angle of repose associated with the fines.

48. The method of claim 43, wherein the plurality of elongated obstruction elements comprises a first set of elongated obstruction elements extending downward at an angle relative to the first sidewall and partially across a width of the belt and a second set of elongated obstruction elements extending downward at an angle relative to the second sidewall and partially across the width of the belt, wherein the first and second sets of elongated obstruction elements are provided in an alternating arrangement such that a continuous "S" flow pattern is defined thereby.

49. The method of claim 48, wherein the angle associated with each of the first and second sets of elongated obstruction elements is an angle, relative to a plane extending across a width of the belt and orthogonal to the length of the belt, that is greater than the angle of repose for the objects to be processed but less than an angle of repose associated with the fines.

50. The method of claim 43, wherein the method further comprises maintaining the endless base section of the at least a portion of the endless belt moving up the incline in a substantially planar configuration using a plurality of rollers positioned between the first position and the second position to maintain the substantially planar configuration.

51. The method of claim 43, wherein the feed mixture comprises rounded iron bearing pellets.

52. The method of claim 43, wherein each of the first and second sidewalls of the belt comprise a proximal end proximate the base section of the belt and a distal end at a predetermined distance measured perpendicularly from the base section, and further wherein the predetermined distance is greater than 3 times the maximum cross-section dimension of the objects of the feed mixture.

53. The method of claim 43, wherein each of the first and second sidewalls comprises a skirt element supported above at least a portion of the base section.

54. The method of claim 43, wherein each of the first and second sidewalls comprises a substantially flat sidewall.

55. The method of claim 43, wherein each of the first and second sidewalls include a first proximal end sealed to the base section along the predetermined length and a second distal end, and further wherein the first and second sidewalls are flexible sidewalls such that the second distal end is expandable to a length that exceeds the predetermined length of the base section.

56. The method of claim 43, wherein the method further comprises:
    monitoring one or more characteristics of the fines removed from the feed mixture and providing an output representative of such monitoring; and
    adjusting the speed of the endless belt and/or the angle of incline based on the output.

57. The method of claim 43, wherein receiving the feed mixture within the channel comprises providing a distribution of the objects across substantially an entire width of the endless belt, the width being orthogonal to the predetermined length.

* * * * *